US006078305A

United States Patent [19]

Mizutani

[11] Patent Number: 6,078,305

[45] Date of Patent: Jun. 20, 2000

[54] DEVICE AND METHOD DISPLAYING A MESH EFFECT WITH LINE BUFFER

[75] Inventor: Kenichi Mizutani, Kanagawa, Japan

[73] Assignee: NEC Corporation, Tokyo, Japan

[21] Appl. No.: 08/965,368

[22] Filed: Nov. 6, 1997

[30] Foreign Application Priority Data

Nov. 8, 1996 [JP] Japan .................................. 8-296321

[51] Int. Cl.[7] ........................................................ G06F 3/00

[52] U.S. Cl. ............................................ 345/113; 345/196

[58] Field of Search .................................... 345/113, 114, 345/435, 196

[56] References Cited

U.S. PATENT DOCUMENTS

| | | | |
|---|---|---|---|
| 4,360,831 | 11/1982 | Kellar | 345/113 |
| 4,398,189 | 8/1983 | Pasierb, Jr. et al. | 345/196 |
| 4,531,120 | 7/1985 | Brownell, Jr. et al. | 345/114 |
| 4,645,459 | 2/1987 | Graf et al. | 345/435 X |
| 4,703,318 | 10/1987 | Haggerty | 345/113 |
| 4,843,568 | 6/1989 | Krueger et al. | 345/114 |
| 4,868,557 | 9/1989 | Perlman et al. | 345/196 X |
| 5,043,714 | 8/1991 | Perlman | 345/113 X |
| 5,386,505 | 1/1995 | Beattie et al. | 345/435 X |
| 5,481,653 | 1/1996 | Kashiwagi et al. | 345/114 X |
| 5,611,027 | 3/1997 | Edgar | 345/435 X |
| 5,847,713 | 12/1998 | Ueda | 345/435 |

FOREIGN PATENT DOCUMENTS

| | | | |
|---|---|---|---|
| 0 199 272 A2 | 10/1986 | European Pat. Off. | G06G 1/16 |
| 48-56032 | 8/1973 | Japan . | |
| 63-61372 | 3/1988 | Japan . | |
| 2 226 938 | 7/1990 | United Kingdom | G06F 15/62 |

OTHER PUBLICATIONS

Foley et al., "Computer Graphics: Principles and Practice", Addison–Wesley Publishing Co., pp. 835–839, Nov. 1993.

*Primary Examiner*—John E. Breene
*Attorney, Agent, or Firm*—Scully, Scott, Murphy & Presser

[57] ABSTRACT

A graphic image display device comprises a display processing section and a line buffer section. The display processing section is provided with a graphics ROM for storing original graphics data of a plurality of graphic images. The display processing section reads original graphics data of a graphic image from the graphics ROM according to a CPU I/F signal supplied from a CPU as graphics processing control information, processes the original graphics data according to the CPU I/F signal, and outputs display graphics data. The line buffer section temporarily stores the display graphics data to be displayed on a line of a display screen. The display processing section includes a mesh pattern generator means and a line buffer write control means. The mesh pattern generator means generates a mesh signal including masking information of a mesh pattern to be given to the display graphics data according to a mesh effect ON/OFF signal. The line buffer write control means controls ON/OFF of writing on the storing of the display graphics data in the line buffer section according to the mesh signal, thereby mesh effect is given to the display graphics data and mesh effect display is realized. According to the device, overlapping display of mesh effect graphics is made possible and transition of display graphics can be executed smoothly, without preparation of huge amount of graphics data or large capacity of the graphics ROM.

6 Claims, 19 Drawing Sheets

DEVICE AND METHOD DISPLAYING A MESH EFFECT WITH LINE BUFFER

BACKGROUND OF THE INVENTION

The present invention relates to a device and a method for displaying graphic images, and in particular, to a device and a method for displaying graphic images suitable for game machines etc. which are needed to execute high speed replacement of display graphic images.

Description of the Related Art

In these days, according to complication and advancement of computer games played with computer game machines, graphic image display devices are beginning to be supposed to have functions for performing various kinds of special effects on displaying graphic images, in order to execute effective presentation to the players of the computer games. Among these special effects, there is 'mesh effect' which is used when emphatic displaying such as fade-out/fade-in is executed in the case where a graphic image is replaced with another graphic image. In the mesh effect display, an area on the display screen to be replaced with another graphic image is partitioned by mesh into small elements, and selected elements of the mesh are blinked, or an initial graphic image is smoothly replaced with another graphic image via mesh effect display.

FIG. 1 is a schematic diagram showing examples of the mesh effect. Mesh effect displays 02–09 for a graphic image 01 are shown in FIG. 1 As a simple example, the graphic image 01 in FIG. 1 is composed of 16×16 pixels, and all the pixels are in a brightness level of black. In the mesh effect displays 02 and 03, black level and white level are displayed alternately in both X-direction and Y-direction. The mesh effect display 03 is the inverse of the mesh effect display 02. In the mesh effect displays 04 and 06, black level and white level are displayed alternately in Y-direction and the same levels are displayed in X-direction, thereby black and white stripes in X-direction are displayed. The mesh effect display 06 is the inverse of the mesh effect display 04. In the mesh effect displays 08 and 09, black level and white level are displayed alternately in X-direction and the same levels are displayed in Y-direction, thereby black and white stripes in Y-direction are displayed. The mesh effect display 09 is the inverse of the mesh effect display 08. In the mesh effect displays 05 and 07, units composed of three white level pixels and one black level pixel are repeated in both X-direction and Y-direction. Each black level pixel is shifted into the neighboring pixel in the replacement of graphic images. The mesh effect display 07 is the inverse of the mesh effect display 05.

FIG. 2 is a schematic diagram showing an example of functions of the mesh effect display. In FIG. 2, a letter 'B' (graphics G4) is replaced with a letter 'A' (graphics G7) in the replacement of graphic images. First, mesh effect is executed to a display area G6 of the letter 'B' (graphics G4), and the letter 'B' (graphics G4) gradually goes out via graphics G5 which is mesh effect display of the letter 'B' (fade-out). Subsequently, the letter 'A' (graphics G7) gradually appears in the same display area G6 (fade-in). As variations of the fade-out/fade-in by the mesh effect display, the following three types of methods are possible. In the first method, the letter 'B' (graphics G4), graphics G5, i.e. the mesh effect display of the letter 'B', and the letter 'A' (graphics G7) are displayed one after another. In the second method, the letter 'B' (graphics G4). graphics G8, i.e. the mesh effect display of the letter 'A', and the letter 'A' (graphics G7) are displayed one after another. And in the third method, the letter 'B' (graphics G4), graphics G5, i.e. the mesh effect display of the letter 'B', graphics G8, i.e. the mesh effect display of the letter 'A', and the letter 'A' (graphics G4) are displayed one after another.

FIG. 3 is a schematic diagram showing an example of a graphic image display. In the following, graphics of a size of 16×16 pixels as shown in FIG. 3 is used for explanation. The origin of each graphics is set at the upper left corner of the graphics, and addresses 0(h)–F(h) in X-direction and Y-direction starting from the origin are assigned to each pixel of the graphics as shown in FIG. 3.

FIG. 4 is a block diagram showing composition of a general conventional graphic image display device. The conventional graphic image display device is installed in or connected to an unshown system such as a game machine which uses the conventional graphic image display device, and a CPU section 1 of the system sends a CPU I/F signal S5 including processing information for displaying graphics to the conventional graphic image display device. The conventional graphic image display device comprises a display processing section 2 for executing display processing according to the CPU I/F signal S5 and outputting graphic display data, and a line buffer section 3 for temporarily storing the graphic display data to be displayed on a line of the display screen.

The display processing section 2 includes a data I/F section 21, a parameter RAM section 22, a FIFO section 23, a timing generator section 24, a ROM address calculation section 25, a graphics ROM section 26, and an output section 27.

The data I/F section 21 receives the CPU I/F signal S5 from the CPU section 1, and outputs a FIFO section input signal S4 and a parameter RAM write signal S6 corresponding to each display graphics, according to the received CPU I/F signal S5.

The parameter RAM section 22 receives the parameter RAM write signal S6 from the data I/F section 21, and stores each graphic display parameter according to the received parameter RAM write signal S6. The parameter RAM section 22 receives a FIFO section output signal S10 from the FIFO section 23, and outputs a ROM origin address signal S11, a Y-coordinate coordinate origin signal S12, and a X-coordinate origin signal S13, according to the received FIFO section output signal S10.

The FIFO section 23 receives the FIFO section input signal S4 from the data I/F section 21, and stores addresses of the parameter RAM section 22 according to the received FIFO section input signal S4. The FIFO section 23 receives a FIFO section request signal S7 from the timing generator section 24, and outputs the FIFO section output signal S10 according to the reception of the FIFO section request signal S7, and outputs a FIFO section emp signal S8 after the output of the FIFO section output signal S10.

The timing generator section 24 receives a vertical synchronous signal S3 and a horizontal synchronous signal S2 from the unshown system such as a game machine which is using the conventional graphic image display device, counts the number of scan lines, and outputs a scan line count signal S9. The timing generator section 24 also outputs the FIFO section request signal S7 and a display start signal S16.

The ROM address calculation section 25 receives the ROM origin address signal S11 and the Y-coordinate origin signal S12 from the parameter RAM section 22 and the scan line count signal S9 from the timing generator section 24, calculates a ROM address according to the signals, and outputs a ROM address signal S15.

The graphics ROM section 26 receives the ROM address signal S15 from the ROM address calculation section 25, and outputs a graphics data signal S17 according to the received ROM address signal S15.

The output section 27 receives a clock signal S1 from the unshown system which is using the conventional graphic image display device, and receives the display start signal S16 from the timing generator section 24. The output section 27 receives the graphics data signal S17 and the X-coordinate origin signal S13, and outputs a line buffer data signal S18, a line buffer write enable signal S19, and a line buffer address signal S20, according to the reception of the clock signal S1 and the display start signal S16.

In the following, the operation and the method of the conventional graphic image display device will be described. FIG. 5 is a schematic diagram showing a storage map of the parameter RAM section 22. FIG. 6 is a schematic diagram showing a storage map of the graphics ROM section 26. FIG. 7 is a timing chart showing timing of display operation, in which 'one screen displaying period', 'graphics undisplaying period', and 'graphics displaying period' each of which will be described below, and display timing of each line of the display screen are shown. FIG. 8 is a timing chart showing timing of each signal during display operation of the FD-th line of the display screen.

In the algorithm used by the conventional graphic image display device, for displaying graphics in normal display and displaying the graphics in the mesh effect display, the graphics in normal display and the graphics in the mesh effect display are treated independently. Each graphics data for each graphics is stored in a storage area in the graphics ROM section 26 for storing the graphics data, respectively. And the normal display and the mesh effect display of the graphics are realized by assigning the respective storage areas of the graphics ROM section 26.

Referring to FIG. 3 and FIG. 6, a display screen G1 is composed of 1×m dots (pixels), and is displaying, for example, graphics G2 which is composed of 16×16 pixels all in black levels and graphics G3 which is composed of black level pixels and white level pixels arranged alternately. The graphics G2 is realized by displaying graphics ROM data R1 shown in FIG. 6 on the display screen G1, putting the upper left origin (0(h), 0(h)) of the graphics ROM data R1 at coordinates (40(h), F6(h)) of the display screen G1. Similarly, the graphics G3 is realized by displaying graphics ROM data R2 shown in FIG. 6 on the display screen G1, putting the upper left origin (0(h),0(h)) of the graphics ROM data R2 at coordinates (80(h),F0(h)) of the display screen G1. Graphics data of each line of graphics is stored in each address of the graphics ROM section 26 as shown in FIG. 6. Incidentally, in FIG. 6, the MSB (Most Significant Bit) of graphics data in an address of the graphics ROM section 26 corresponds to the right end pixel of a line of the graphics, and the LSB (Least Significant Bit) of graphics data in the address corresponds to the left end pixel of the line of the graphics. And graphics data '1' corresponds to a black level pixel and graphics data '0' corresponds to a white level pixel. For example, in an address 10(h) of the graphics ROM section 26, the graphics data 5555(h) (0101010101010101) corresponds to a sequence of pixels 'BWBWBWBWBWBWBWBW (B:Black, W:White)' (The MSB of graphics data corresponds to the right end pixel.), and in an address 0(h) of the graphics ROM section 26, the graphics data FFFF(h) (1111111111111111) corresponds to a sequence of pixels 'BBBBBBBBBBBBBBBB'.

In FIG. 6, graphics ROM data R1 and R2 corresponding to the graphics G2 and G3 respectively are shown on the left side, and graphic images corresponding to the graphics ROM data R1 and R2 respectively are shown on the right side.

Referring to FIG. 5, in the storage map of the parameter RAM section 22, the address of the origin of the graphics ROM data stored in the graphics ROM section 26 (see FIG. 6) is set as a value P0, the Y-coordinate value of the origin of the display graphics is set as a value P1, and the X-coordinate value of the origin of the display graphics is set as a value P2. For example, the above three values P0, P1 and P2 for the graphics G2 are set in an address 5(h) of the parameter RAM section 22, and the above three values P0, P1 and P2 for the graphics G3 are set in an address 9(h) of the parameter RAM section 22.

In the following, display processing for the FD-th line of the display screen G1 will be explained for example.

First, referring to FIG. 4, the display processing section 2 is supplied with the clock signal S1, the horizontal synchronous signal S2, and the vertical synchronous signal S3, from the unshown system such as a game machine which is using the conventional graphic image display device.

Referring to FIG. 7, a term between activation (i.e. a falling edge) of the vertical synchronous signal S3 and activation of the next vertical synchronous signal S3 will be hereafter called 'one screen displaying period'. A term between activation of the vertical synchronous signal S3 and activation of the first horizontal synchronous signal S2 will be hereafter called 'graphics undisplaying period'. And a term between the activation of the first horizontal synchronous signal S2 and the activation of the next vertical synchronous signal S3 will be hereafter called 'graphics displaying period'.

Parameters for displaying graphics are set in the parameter RAM section 22 during the graphics undisplaying period. In the graphics displaying period, the scan line count signal S9 counted and outputted by the timing generator section 24 is incremented by one on every activation of the horizontal synchronous signal S2. The one screen displaying period is over when the timing generator section 24 is supplied with all the horizontal synchronous signals S2 for the line 0 through the line 1 as shown in FIG. 7.

FIG. 8 is a timing chart showing detailed timing in display processing for the FD-th line of the display screen G1.

First, the timing generator section 24 is initialized according to the supply of the vertical synchronous signal S3 into the display processing section 2. The data I/F section 21 is supplied with the CPU I/F signal S5 from the CPU section 1 during the graphics undisplaying period, identifies the instruction in the CPU I/F signal S5, and outputs the contents of the identified instruction into the parameter RAM section 22 as the parameter RAM write signal S6. Then, data P0=0(h), P1=F6(h) and P2=40(h) are set in the address 5(h) of the parameter RAM section 22, and data P0=10(h), P1=F0(h) and P2=80(h) are set in the address 9(h) of the parameter RAM section 22.

The timing generator section 24 counts the number of the supply of the horizontal synchronous signal S2 (falling edge), and the scan line count signal S9 is incremented on every supply (i.e. activation) of the horizontal synchronous signal S2, and eventually, the scan line count signal S9 becomes FD(h). The timing generator section 24 is initialized on every supply of the horizontal synchronous signal S2. Subsequently, the data I/F section 21 is supplied with the CPU I/F signal S5 from the CPU section 1, and stores the FIFO section input signal S4 (S4=5(h), 9(h)) according to the CPU I/F signal S5, in the FIFO section 23 in the order of display. The FIFO section 23 sets the FIFO section emp signal S8 which is supplied to the timing generator section 24 at 1(h) when no data is stored therein, and on storing data, the FIFO section 23 sets the FIFO section emp signal S8 at 0(h), and consequently, output of the FIFO section request signal S7 by the timing generator section 24 is enabled.

After the storing period of the FIFO section 23 is over, the timing generator section 24 supplies the FIFO section request signal S7 to the FIFO section 23, and according to the supply of the FIFO section request signal S7, the FIFO section 23 sends the FIFO section output signal S10 (S10=5(h)) to the parameter RAM section 22 as a reading address. Then, the parameter RAM section 22 outputs the ROM origin address signal S11 (P0=0(h)), the Y-coordinate origin signal S12 (P1=F6(h)), and the X-coordinate origin signal S13 (P2=40(h)), according to the supply of the FIFO section output signal S10=5(h). Then, the ROM address calculation section 25 calculates a ROM address using the ROM origin address signal S11, the scan line count signal S9 and the Y-coordinate origin signal S12, and outputs the ROM address signal S15 (S15=7(h)) to the graphics ROM section 26. The ROM address is an address in the graphics ROM section 26 where the graphics data of a line of the graphics G2 which should be displayed on the FD-th line of the display screen G1 is stored. Then, the graphics ROM section 26 outputs the graphics data signal S17 (S17=FFFF(h)) corresponding to the supplied ROM address signal S15=7(h) into the output section 27.

Subsequently, the timing generator section 24 sends the display start signal S16 to the output section 27. Then, according to the supply of the display start signal S16, the output section 27 increments the line buffer address signal S20 which is supplied to the line buffer section 3 from 40(h) to 4F(h) (see FIG. 3) on every supply of the clock signal S1. The output section 27 also supplies the line buffer section 3 with each bit of the line buffer data signal S18 (S18=1111111111111111) on every supply of the clock signal S1. The line buffer write enable signal S19 which is sent from the output section 27 to the line buffer section 3 is generally set at 1(h), and is set at 0(h) while the line buffer address signal S20 is outputted and incremented.

The display processing section 2 stores the graphics data of the line of the graphics G2 in the line buffer section 3 as described above.

On the storage of the graphics data, the timing generator section 24 sends the FIFO section request signal S7 to the FIFO section 23. The FIFO section 23 outputs the FIFO section output signal S10 (S10=9(h)) to the parameter RAM section 22, according to the supply of the FIFO section request signal S7. The FIFO section 23 which has become empty by the output of the data 9(h) sends the FIFO section emp signal S8 (S8=1(h)) to the timing generator section 24. According to the supply of the FIFO section output signal S10=9(h) as a reading address, the parameter RAM section 22 outputs the ROM origin address signal S11 (P0=10(h)), the Y-coordinate origin signal S12 (P1=F0(h)), and the X-coordinate origin signal S13 (P2=80(h)). Then, the ROM address calculation section 25 calculates a ROM address using the ROM origin address signal S11, the scan line count signal S9 and the Y-coordinate origin signal S12, and outputs the ROM address signal S15 (S15=1D(h)) to the graphics ROM section 26. The ROM address is an address in the graphics ROM section 26 where the graphics data of a line of the graphics G3 which should be displayed on the FD-th line of the display screen G1 is stored. Then, the graphics ROM section 26 outputs the graphics data signal S17 (S17=AAAA(h)), corresponding to the supplied ROM address signal S15=1D(h), into the output section 27.

Subsequently, the timing generator section 24 sends the display start signal S16 to the output section 27 again. Then, according to the supply of the display start signal S16, the output section 27 increments the line buffer address signal S20 which is supplied to the line buffer section 3 from 80(h) to 8F(h) (see FIG. 3) on every supply of the clock signal S1. The output section 27 also supplies the line buffer section 3 with each bit of the line buffer data signal S18 (S18=0101010101010101) on every supply of the clock signal S1.

The display processing section 2 stores the graphics data of the line of the graphics G3 in the line buffer section 3 as described above. Then, the timing generator section 24 disables output of the next FIFO section request signal S7 since the FIFO section 23 is outputting the FIFO section emp signal S8=1(h) at that time, and display processing of the FD-th line of the display screen G1 is completed.

As described above, in the conventional graphic image display device, mesh effect display is realized by preparing graphics data for displaying graphics in normal display and graphics data for displaying the graphics in the mesh effect display in the graphics ROM section 26, and treating each graphics data independently.

However, for executing special effect such as fade-out/fade-in etc. by the mesh effect display, every graphics data for normal display and mesh effect display of each graphics has to be prepared in the graphics ROM section 26, and thus preparation of huge amount of graphics data and considerably large capacity of the ROM are necessary.

FIG. 9 is a block diagram showing composition of a graphic image display device which is proposed by the present inventors, in which the same reference characters as those of FIG. 4 designate the same or corresponding parts to those of FIG. 4 and thus repeated description thereof is omitted for brevity. The graphic image display device comprises a display processing section 2A instead of the display processing section 2 of FIG. 4. The display processing section 2A includes a mesh pattern generator section 28 and a data mask section 29.

The mesh pattern generator section 28 is supplied with the scan line count signal S9 from the timing generator section 24, a mesh effect ON/OFF signal S14 from the parameter RAM section 22, and the ROM address signal S15 from the ROM address calculation section 25. The mesh pattern generator section 28 generates a mesh pattern according to the supplied scan line count signal S9, the mesh effect ON/OFF signal S14, and the ROM address signal S15, and supplies a mesh signal S21 to the data mask section 29.

The data mask section 29 executes masking to the graphics data signal S17 read out from the graphics ROM section 26 according to the supplied mesh signal S21, and outputs a processed graphics data signal S23 to the output section 27.

The display processing section 2A executes masking to the original display graphics data and thereby executes mesh effect display of the display graphics.

In the following, the operation and the method of the graphic image display device proposed by the present inventors will be described. FIG. 10 is a schematic diagram showing a storage map of the parameter RAM section 22 of the graphic image display device. Referring to FIG. 10 and FIG. 3 which is common to the conventional graphic image display device and the device proposed by the present inventors, a display screen G1 is composed of 1×m dots (pixels), and is displaying, for example, graphics G2 which is composed of 16×16 pixels all in black levels and graphics G3 which is composed of black level pixels and white level pixels arranged alternately. The graphics G2 is realized by displaying graphics ROM data R1 shown in FIG. 11 on the display screen G1, putting the upper left origin (0(h),0(h)) of the graphics ROM data R1 at coordinates (40(h),F6(h)) of the display screen G1. The graphics G3 is realized by displaying the same original graphics ROM data R1 on the display screen G1, with executing masking operation to the graphics ROM data R1, putting the upper left origin (0(h), 0(h)) of the masked graphics ROM data R1 at coordinates (80(h),F0(h)) of the display screen G1.

Referring to FIG. 10 which is showing the storage map of the parameter RAM section 22, in order to display the graphics on the display screen G1 as shown in FIG. 3, the address of the origin of the graphics ROM data stored in the graphics ROM section 26 (see FIG. 11) is set as a value P0, the Y-coordinate value of the origin of the display graphics is set as a value P1, the X-coordinate value of the origin of the display graphics is set as a value P2, and ON/OFF information of mesh effect is set as a value P3. For example, the above four values P0, P1, P2 and P3 for the graphics G2 are set in an address 3(h) of the parameter RAM section 22, and the above four values P0, P1, P2 and P3 for the graphics G3 are set in an address 7(h) of the parameter RAM section 22.

In the following, display processing for the FD-th line of the display screen G1 will be explained for example, mainly on the difference from the conventional graphic image display device, referring to the block diagram FIG. 9, the storage map FIG. 10, and timing charts FIG. 7 (one screen displaying period) and FIG. 12 (FD-th line displaying period). Incidentally, normal display of graphics is executed when P3=0. and mesh effect display of graphics is executed when P3=1 in this example.

First, the timing generator section 24 in the display processing section 2A is initialized according to supply of the vertical synchronous signal S3 into the display processing section 2A. The data I/F section 21 is supplied with the CPU I/F signal S5 from the CPU section 1 during the graphics undisplaying period, identifies the instruction in the CPU I/F signal S5, and outputs the contents of the identified instruction into the parameter RAM section 22 as the parameter RAM write signal S6. Then, data P0=0(h), P1=F6 (h), P2=40(h) and P3=0(h) are set in the address 3(h) of the parameter RAM section 22, and data P0=0(h), P1=F0(h), P2=80(h) and P3=1(h) are set in the address 7(h) of the parameter RAM section 22.

The timing generator section 24 counts the number of the supply of the horizontal synchronous signal S2 (falling edge), and the scan line count signal S9 is incremented on every supply (i.e. activation) of the horizontal synchronous signal S2, and eventually, the scan line count signal S9 becomes FD(h). The timing generator section 24 is initialized on every supply of the horizontal synchronous signal S2. Subsequently, the data I/F section 21 identifies the instruction in the CPU I/F signal S5 supplied from the CPU section 1, and stores the FIFO section input signal S4 (S4=3(h), 7(h)) in the FIFO section 23 in the order of display, according to the instruction in the CPU I/F signal S5. The FIFO section 23 sets the FIFO section emp signal S8, which is supplied to the timing generator section 24, at 0(h) according to storage of data, and consequently, output of the FIFO section request signal S7 by the timing generator section 24 is enabled.

After the storing period of the FIFO section 23 is over, the timing generator section 24 supplies the FIFO section request signal S7 to the FIFO section 23, and according to the supply of the FIFO section request signal S7, the FIFO section 23 sends the FIFO section output signal S10 (S10= 3(h)) to the parameter RAM section 22 as a reading address. Then, the parameter RAM section 22 outputs the ROM origin address signal S11 (P0=0(h)), the Y-coordinate origin signal S12 (P1=F6(h)), the X-coordinate origin signal S13 (P2=40(h)), and the mesh effect ON/OFF signal S14 (P3= 0(h)), according to the supply of the FIFO section output signal S10=3(h). Then, the ROM address calculation section 25 calculates a ROM address using the ROM origin address signal S11, the scan line count signal S9 and the Y-coordinate origin signal S12, and outputs the ROM address signal S15 (S15=7(h)) to the graphics ROM section 26. The ROM address is an address in the graphics ROM section 26 where the graphics data of a line of the graphics G2 which should be displayed on the FD-th line of the display screen G1 is stored. Then, the graphics ROM section 26 outputs the graphics data signal S17 (S17=FFFF(h)) corresponding to the supplied ROM address signal S15=7(h) into the data mask section 29.

Subsequently, according to the mesh effect ON/OFF signal S14=0(h) supplied from the parameter RAM section 22 and the scan line count signal S9 supplied from the timing generator section 24, the mesh pattern generator section 28 outputs the mesh signal S21 (S21=FFFF(h)) to the data mask section 29. Each bit '1' in the mesh signal S21=FFFF(h) (1111111111111111) is an instruction not to execute masking to each bit of the graphics data signal S17. According to the supplied mesh signal S21=FFFF(h), the data mask section 29 executes no masking to the graphics data signal S17= FFFF(h) supplied from the graphics ROM section 26, and supplies the graphics data signal S17=FFFF(h) into the output section 27 as the processed graphics data signal S23.

Subsequently, the timing generator section 24 sends the display start signal S16 to the output section 27. Then, according to the supply of the display start signal S16, the output section 27 increments the line buffer address signal S20 which is supplied to the line buffer section 3 from 40(h) to 4F(h) (see FIG. 3) on every supply of the clock signal S1. The output section 27 also supplies the line buffer section 3 with each bit of the line buffer data signal S18 (S18= 1111111111111111) on every supply of the clock signal S1. In the same way as the conventional graphic image display device, the line buffer write enable signal S19, which is generally set at 1(h), is set at 0(h) while the line buffer address signal S20 is outputted and incremented.

The output section supplies the line buffer section 3 with the line buffer data signal S18 for the line of the graphics G2, the line buffer write enable signal S19, and the line buffer address signal S20.

The display processing section 2A stores the graphics data of the line of the graphics G2 in the line buffer section 3 as described above.

On the storage of the graphics data, the timing generator section 24 sends the FIFO section request signal S7 to the FIFO section 23. The FIFO section 23 outputs the FIFO section output signal S10 (S10=7(h)) to the parameter RAM section 22, according to the supply of the FIFO section request signal S7. The FIFO section 23 which has become empty by the output of the data 7(h) sends the FIFO section emp signal S8 (S8=1(h)) to the timing generator section 24. According to the supply of the FIFO section output signal S10=7(h) as a reading address, the parameter RAM section 22 outputs the ROM origin address signal S11 (P0=0(h)), the Y-coordinate origin signal S12 (P1=F0(h)), the X-coordinate origin signal S13 (P2=80(h)), and the mesh effect ON/OFF signal S14 (P3=1(h)). Then, the ROM address calculation section 25 calculates a ROM address using the ROM origin address signal Sit, the scan line count signal S9 and the Y-coordinate origin signal S12, and outputs the ROM address signal S15 (S15=D(h)) to the graphics ROM section 26. Then, the graphics ROM section 26 outputs the graphics data signal S17 (S17=FFFF(h)), corresponding to the supplied ROM address signal S15=D(h), into the data mask section 29.

Subsequently, according to the mesh effect ON/OFF signal S14=1(h), the ROM address signal S15=D(h), and the scan line count signal S9, the mesh pattern generator section 28 outputs the mesh signal S21 (S21=AAAA(h)) to the data mask section 29. Each bit '0' in the mesh signal S21=AAAA (h) (1010101010101010) is an instruction to execute masking to corresponding bit of the graphics data signal S17. According to the supplied mesh signal S21=AAAA(h), the data mask section 29 executes masking to the graphics data signal S17=FFFF(h) supplied from the graphics ROM section 26 and generates the processed graphics data signal S23=AAAA(h) (1010101010101010). and supplies the processed graphics data signal S23=AAAA(h) to the output section 27.

Subsequently, the timing generator section 24 sends the display start signal S16 to the output section 27 again. Then, according to the supply of the display start signal S16, the output section 27 increments the line buffer address signal S20 which is supplied to the line buffer section 3 from 80(h) to 8F(h) (see FIG. 3) on every supply of the clock signal S1. The output section 27 also supplies the line buffer section 3 with each bit of the line buffer data signal S18 (S18=0101010101010101) on every supply of the clock signal S1.

The display processing section 2A stores the graphics data of the line of the graphics G3 in the line buffer section 3 as described above. Then, the timing generator section 24 disables output of the next FIFO section request signal S7 since the FIFO section 23 is outputting the FIFO section emp signal S8=1(h) at that time, and display processing of the FD-th line of the display screen G1 is completed.

As described above, in the graphic image display device proposed by the present inventors, mesh effect display is realized by preparing original graphics data only, in the graphics ROM section 26, and executing masking to the graphics data according to the mesh signal S21 generated by the mesh pattern generator section 28 according to the mesh effect ON/OFF signal S14, the scan line count signal S9 and the ROM address signal S15. Therefore, in the graphic image display device proposed by the present inventors, preparation of huge amount of graphics data and considerably large capacity of the graphics ROM section 26 are not necessary for executing special effect such as fade-out/fade-in etc. by the mesh effect display.

However, in the graphic image display device proposed by the present inventors, in the case where the letter 'B' (graphics G4) gradually goes out via graphics G5 (mesh effect display of the letter 'B') (fade-out), and the letter 'A' (graphics G7) gradually appears in the same display area G6 (fade-in) as shown in FIG. 2, it is impossible to display the letter 'A' (graphics G7) overlapped on the mesh effect graphics G5 in transitional display, and thus transition of display graphics can not be executed smoothly. For example, when graphic data for a line of the letter 'A' (graphics G7) is stored in the line buffer section 3, it is possible to overwrite graphic data for a line of the graphics G5 on the graphic data for the line of the letter 'A' (graphics G7) stored in the line buffer section 3. However, in this case, all of the graphic data for the line of the letter 'A' (graphics G7) disappears, and only the graphics G5 (mesh effect display of the letter 'B') is displayed on the line of the display screen.

SUMMARY OF THE INVENTION

It is therefore the primary object of the present invention to provide a device and a method for displaying graphic images, by which overlapping display of mesh effect graphics is made possible and transition of display graphics can be executed smoothly, without preparation of huge amount of graphics data or large capacity of the graphics ROM.

The aforementioned disappearance of the graphic data in the line buffer section 3 occurs since every bit of the line buffer data signal S18 in the graphic image display device proposed by the present inventors is always written into the line buffer section 3. If part of the line buffer data signal S18 is not written into the line buffer section 3, overlapping display of mesh effect graphics is made possible. The idea is realized by the device and the method for displaying graphic images according to the present invention.

In accordance with the present invention, there is provided a graphic image display device comprising a display processing section and a line buffer section. The display processing section is provided with a graphics ROM for storing original graphics data of a plurality of graphic images. The display processing section reads original graphics data of a graphic image from the graphics ROM according to a CPU I/F signal supplied from a CPU as graphics processing control information, processes the original graphics data according to the CPU I/F signal, and outputs display graphics data. The line buffer section temporarily stores the display graphics data to be displayed on a line of a display screen. The display processing section includes a mesh pattern generator means and a line buffer write control means. The mesh pattern generator means generates a mesh signal including masking information of a mesh pattern to be given to the display graphics data according to a mesh effect ON/OFF signal which is generated according to instructions in the CPU I/F signal. The line buffer write control means controls ON/OFF of writing on the storing of the display graphics data in the line buffer section according to the mesh signal, thereby mesh effect is given to the display graphics data and mesh effect display is realized.

Preferably, the line buffer write control means includes a write enable mask section for executing masking to a line buffer write enable signal which enables writing into the line buffer section, according to the value of the mesh signal.

Preferably, the display processing section includes a data I/F section, a parameter RAM section, a FIFO section, a timing generator section, a ROM address calculation section, a graphics ROM section, and an output section. The data I/F section receives the CPU I/F signal, identifies instructions in the CPU I/F signal, and outputs a FIFO section input signal and a parameter RAM write signal corresponding to each display graphics according to the instructions in the CPU I/F signal. The parameter RAM section stores each graphic display parameter according to the parameter RAM write signal, and outputs a ROM origin address signal indicating an address of the origin of the original graphics data of a graphic image stored in the graphics ROM, a X-coordinate origin signal indicating a X-coordinate of the origin of the graphic image to be displayed on the display screen, a Y-coordinate origin signal indicating a Y-coordinate of the origin of the graphic image to be displayed on the display screen, and the mesh effect ON/OFF signal indicating ON/OFF of the mesh effect, according to supply of a FIFO section output signal. The FIFO section stores addresses of the parameter RAM section according to the FIFO section input signal, and outputs the FIFO section output signal according to supply of a FIFO section request signal. The timing generator section receives a vertical synchronous signal and a horizontal synchronous signal from a system which uses the graphic image display device, counts the number of scan lines, outputs a scan line count signal, generates the FIFO section request signal requesting the FIFO section to output an address of the parameter RAM section, and generates a display start signal. The ROM address calculation section calculates a ROM address using the ROM origin address signal, the scan line count signal and the Y-coordinate origin signal, and outputs a ROM address signal. The graphics ROM section provided with the graphics ROM outputs a graphics data signal according to the ROM address signal. The output section receives the graphics data signal and the X-coordinate origin signal, and outputs a line buffer data signal, a line buffer write enable signal, and a line buffer address signal, according to supply of a clock signal from the system using the graphic image display device and the display start signal.

Preferably, the parameter RAM section stores ROM origin address information corresponding to the ROM origin address signal, X-coordinate origin information corresponding to the X-coordinate origin signal, Y-coordinate origin information corresponding to the Y-coordinate origin signal, and mesh effect ON/OFF information corresponding to the mesh effect ON/OFF signal, as the graphic display parameters, and graphics data of a graphic image stored in an address of the graphics ROM indicated by the ROM origin address signal is displayed on the display screen putting the origin of the graphic image on coordinates of the display screen indicated by the X-coordinate origin signal and the Y-coordinate origin signal, in which normal display of the graphic image is executed according to the first value of the mesh effect ON/OFF signal and mesh effect display of the graphic image is executed according to the second value of the mesh effect ON/OFF signal.

In accordance with another aspect of the present invention, there is provided a method for displaying graphic images comprising the following basic steps. In the first basic step, original graphics data of a graphic image is read from a graphics ROM in a display processing section which stores original graphics data of a plurality of graphic images, according to a CPU I/F signal supplied from a CPU as graphics processing control information. In the second basic step, the original graphics data is processed according to the CPU I/F signal and display graphics data is generated. In the third basic step, the display graphics data is outputted from the display processing section to a line buffer section for temporarily storing the display graphics data to be displayed on a line of a display screen. In the fourth basic step the display graphics data is temporarily stored in the line buffer section. And in the fifth basic step, the display graphics data is displayed on the line of the display screen. The method further includes the following steps. In the first step, it is judged whether or not instruction to execute mesh effect display is included in the CPU I/F signal and a mesh effect ON/OFF signal is generated. In the second step, a mesh signal including masking information of a mesh pattern to be given to the display graphics data is generated according to the mesh effect ON/OFF signal. And in the third step, ON/OFF of writing on the storing of the display graphics data in the line buffer section is controlled according to the mesh signal, and thereby mesh effect is given to the display graphics data and mesh effect display is realized. Preferably, the control of the ON/OFF of the writing is realized by executing masking to a line buffer write enable signal for enabling writing into the line buffer section, according to the value of the mesh signal.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Figure 1:
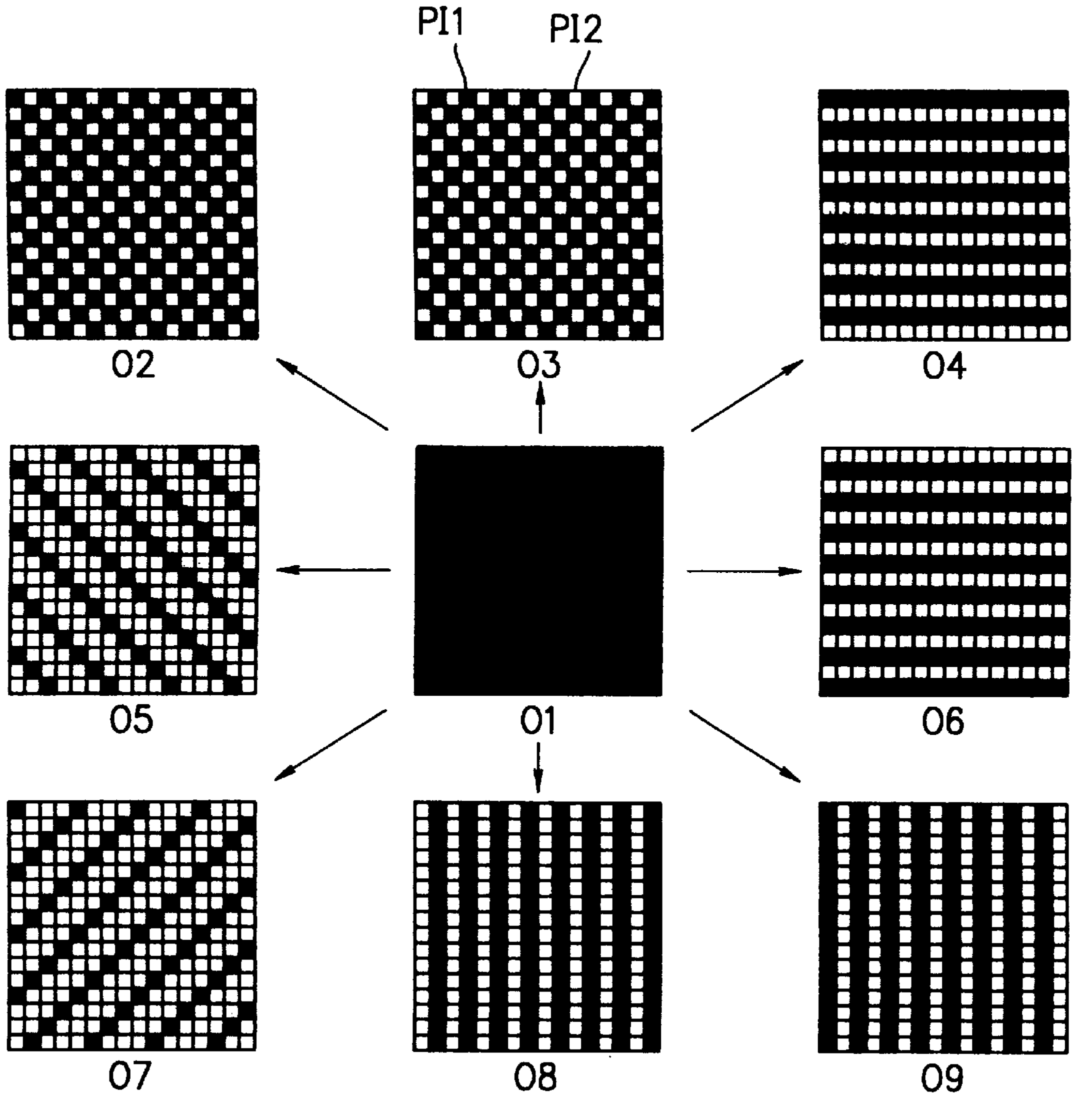
FIG. 1 is a schematic diagram showing examples of mesh effects.

Referring now to the drawings, a description will be given in detail of preferred embodiments in accordance with the present invention.

Figure 9:
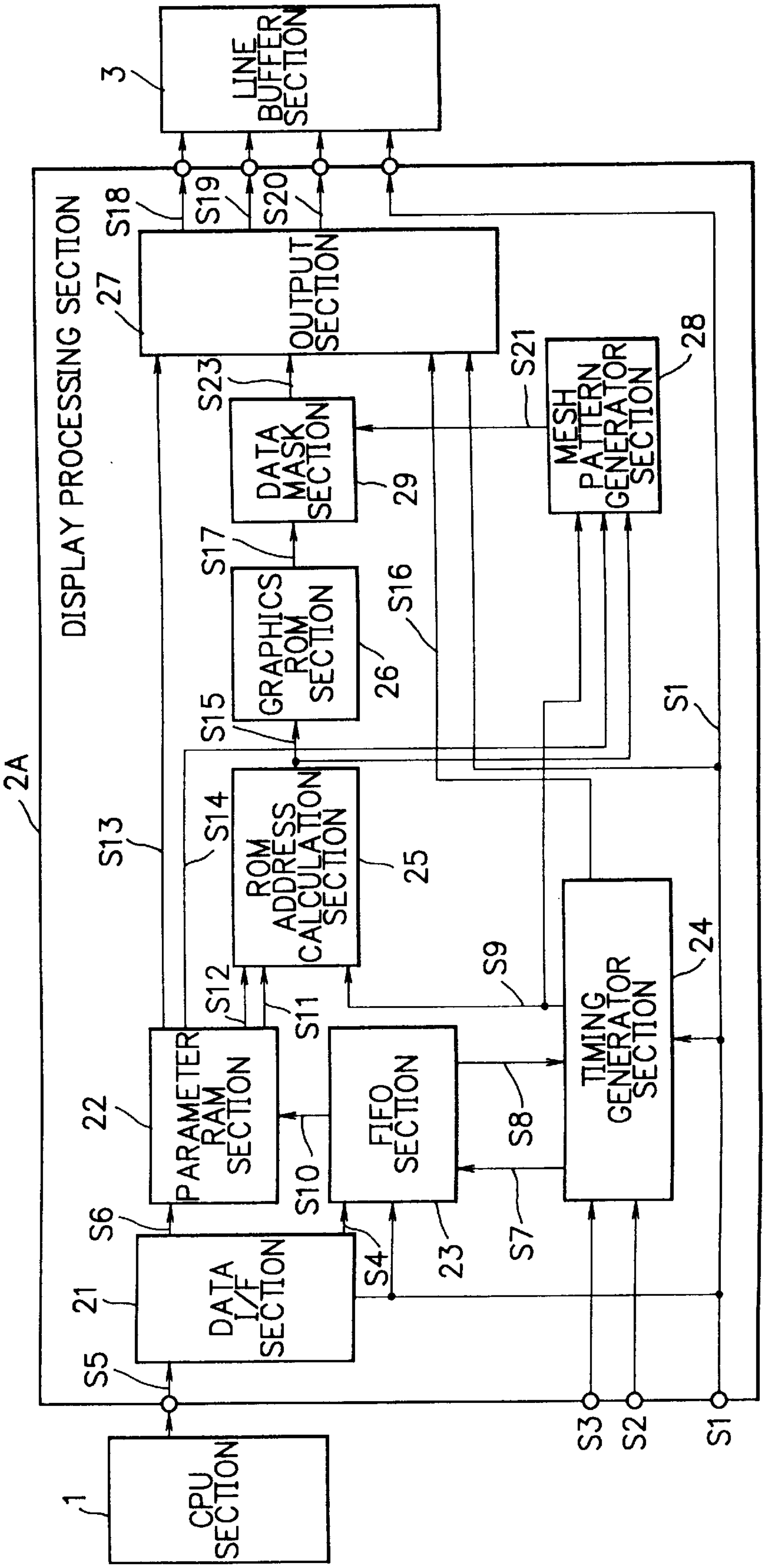
FIG. 9 is a block diagram showing composition of a graphic image display device which is proposed by the present inventors.
Figure 13:
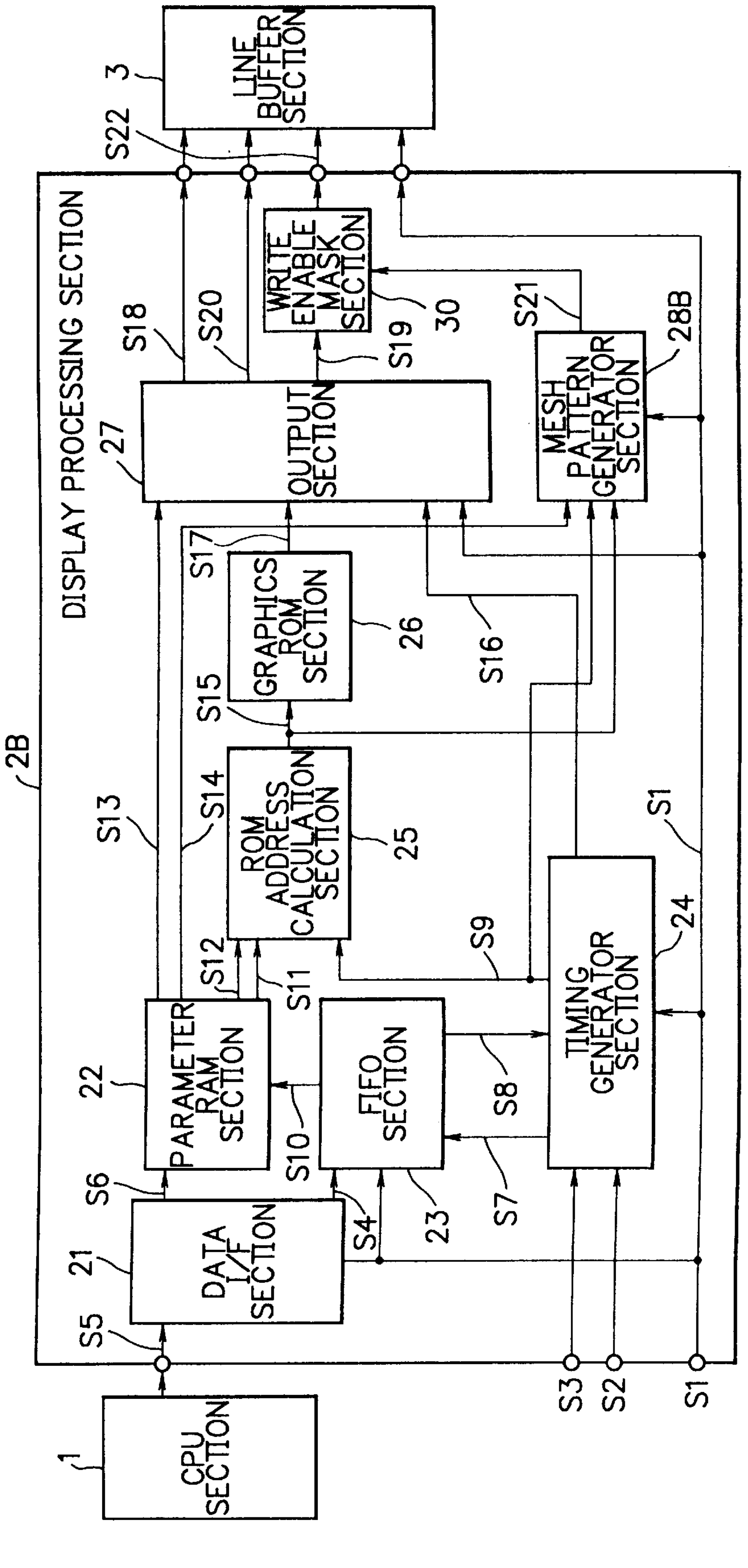
FIG. 13 is a block diagram showing composition of a graphic image display device according to an embodiment of the present invention.

FIG. 13 is a block diagram showing composition of the graphic image display device according to an embodiment of the present invention, in which the same reference characters as those of FIG. 9 designate the same or corresponding parts to those of FIG. 9.

The graphic image display device is installed in or connected to an unshown system such as a game machine which uses the graphic image display device, and a CPU section 1 of the system sends a CPU I/F signal S5 including processing information for displaying graphics to the graphic image display device. The graphic image display device comprises a display processing section 2B for executing display processing according to the CPU I/F signal S5 and outputting graphic display data, and a line buffer section 3 for temporarily storing the graphic display data to be displayed on a line of the display screen. The display processing section 2B is different from the display processing section 2A in the graphic image display device of FIG. 9.

The display processing section 2B includes a data I/F section 21, a parameter RAM section 22, a FIFO section 23, a timing generator section 24, a ROM address calculation section 25, a graphics ROM section 26, and an output section 27, in the same way as the display processing section 2A of the graphic image display device of FIG. 9.

The display processing section 2B further includes a mesh pattern generator section 28B and a write enable mask section 30.

The data I/F section 21 receives the CPU I/F signal S5 from the CPU section 1, and outputs a FIFO section input signal S4 and a parameter RAM write signal S6 corresponding to each display graphics, according to the received CPU I/F signal S5.

The parameter RAM section 22 receives the parameter RAM write signal S6 from the data I/F section 21, and stores each graphic display parameter according to the received parameter RAM write signal S6. The parameter RAM section 22 receives a FIFO section output signal SlO from the FIFO section 23. and outputs a ROM origin address signal S11, a Y-coordinate origin signal S12, a X-coordinate origin signal S13, and a mesh effect ON/OFF signal S14 according to the received FIFO section output signal S10.

The FIFO section 23 receives the FIFO section input signal S4 from the data I/F section 21, and stores addresses of the parameter RAM section 22 according to the received FIFO section input signal S4. The FIFO section 23 receives a FIFO section request signal S7 from the timing generator section 24, and outputs the FIFO section output signal S10 according to the reception of the FIFO section request signal S7, and outputs a FIFO section emp signal S8 after the output of the FIFO section output signal S10.

The timing generator section 24 receives a vertical synchronous signal S3 and a horizontal synchronous signal S2 from an unshown system such as a game machine which is using the graphic image display device, counts the number of scan lines, and outputs a scan line count signal S9. The timing generator section 24 also outputs the FIFO section request signal S7 and a display start signal S16.

The ROM address calculation section 25 receives the ROM origin address signal S11 and the Y-coordinate origin signal S12 from the parameter RAM section 22 and the scan line count signal S9 from the timing generator section 24, calculates a ROM address according to the signals, and outputs a ROM address signal S15.

The graphics ROM section 26 receives the ROM address signal S15 from the ROM address calculation section 25, and outputs a graphics data signal S17 according to the received ROM address signal S15.

The output section 27 receives a clock signal S1 from the unshown system which is using the graphic image display device, and receives the display start signal S16 from the timing generator section 24. The output section 27 receives the graphics data signal S17 and the X-coordinate origin signal S13, and outputs a line buffer data signal S18, a line buffer write enable signal S19, and a line buffer address signal S20, according to the reception of the clock signal S1 and the display start signal S16.

The above functions of parts of the graphic image display device are the same as those of the device of FIG. 9.

The mesh pattern generator section 28B is supplied with the scan line count signal S9, the mesh effect ON/OFF signal S14 and the ROM address signal S15, generates a mesh signal 21 according to the supplied signals, and outputs each bit of the mesh signal 21 synchronized with the clock signal S1.

The write enable mask section 30 executes masking to the line buffer write enable signal S19 supplied from the output section 27 according to the supplied mesh signal S21, and outputs a masked line buffer write enable signal S22.

The display processing section 2B executes mesh effect display by executing masking to the line buffer write enable signal S19 on storing of the graphics data into the line buffer 3.

Figure 10:
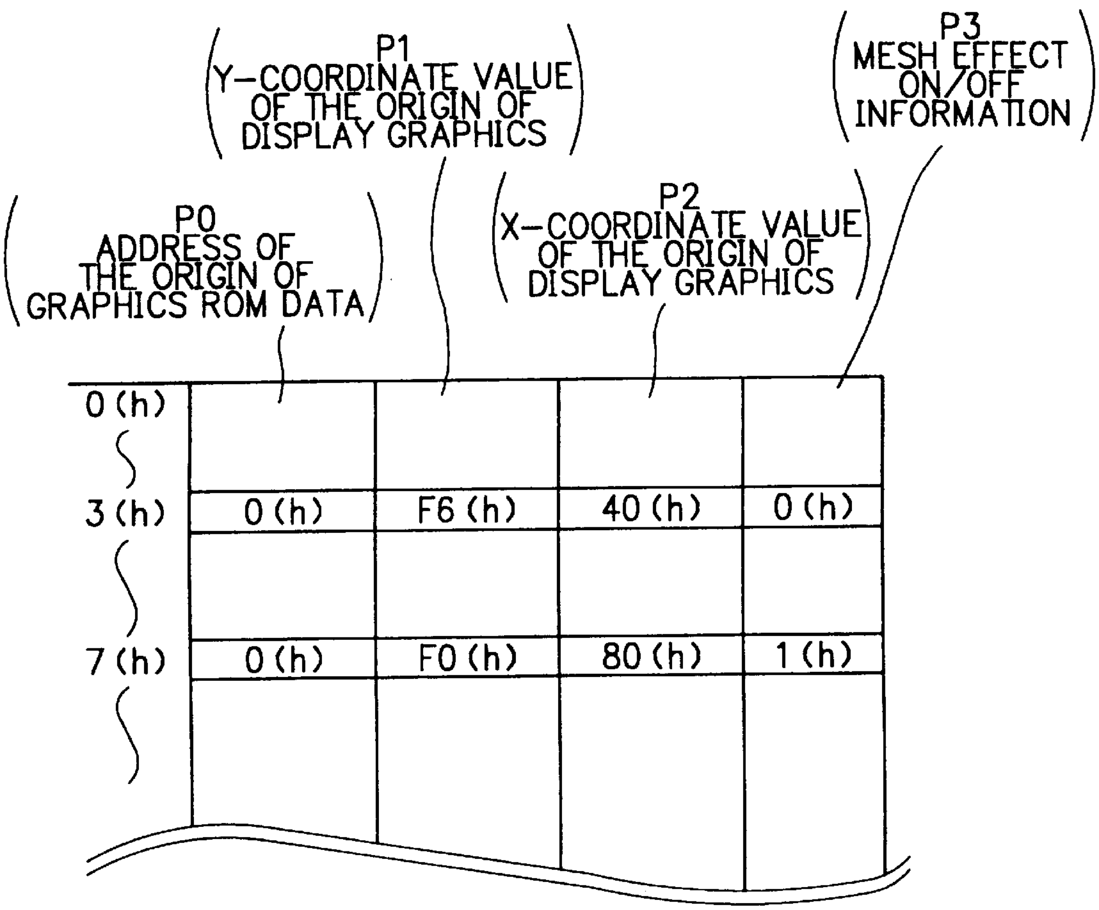
FIG. 10 is a schematic diagram showing a storage map of a parameter RAM section 22 of the graphic image display device of FIG. 9.
Figure 11:
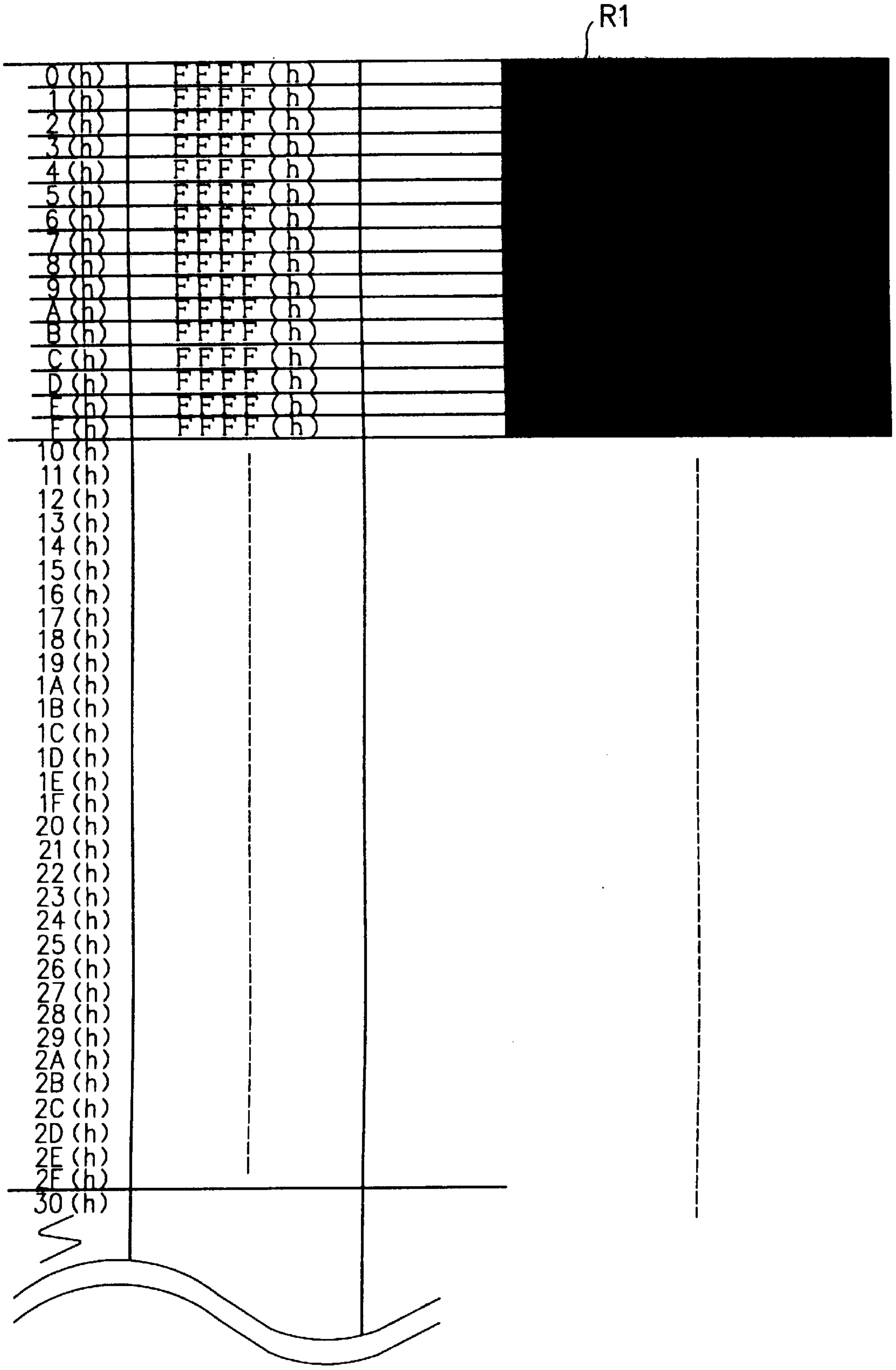
FIG. 11 is a schematic diagram showing a storage map of a graphics ROM section of the graphic image display device of FIG. 9.
Figure 12:
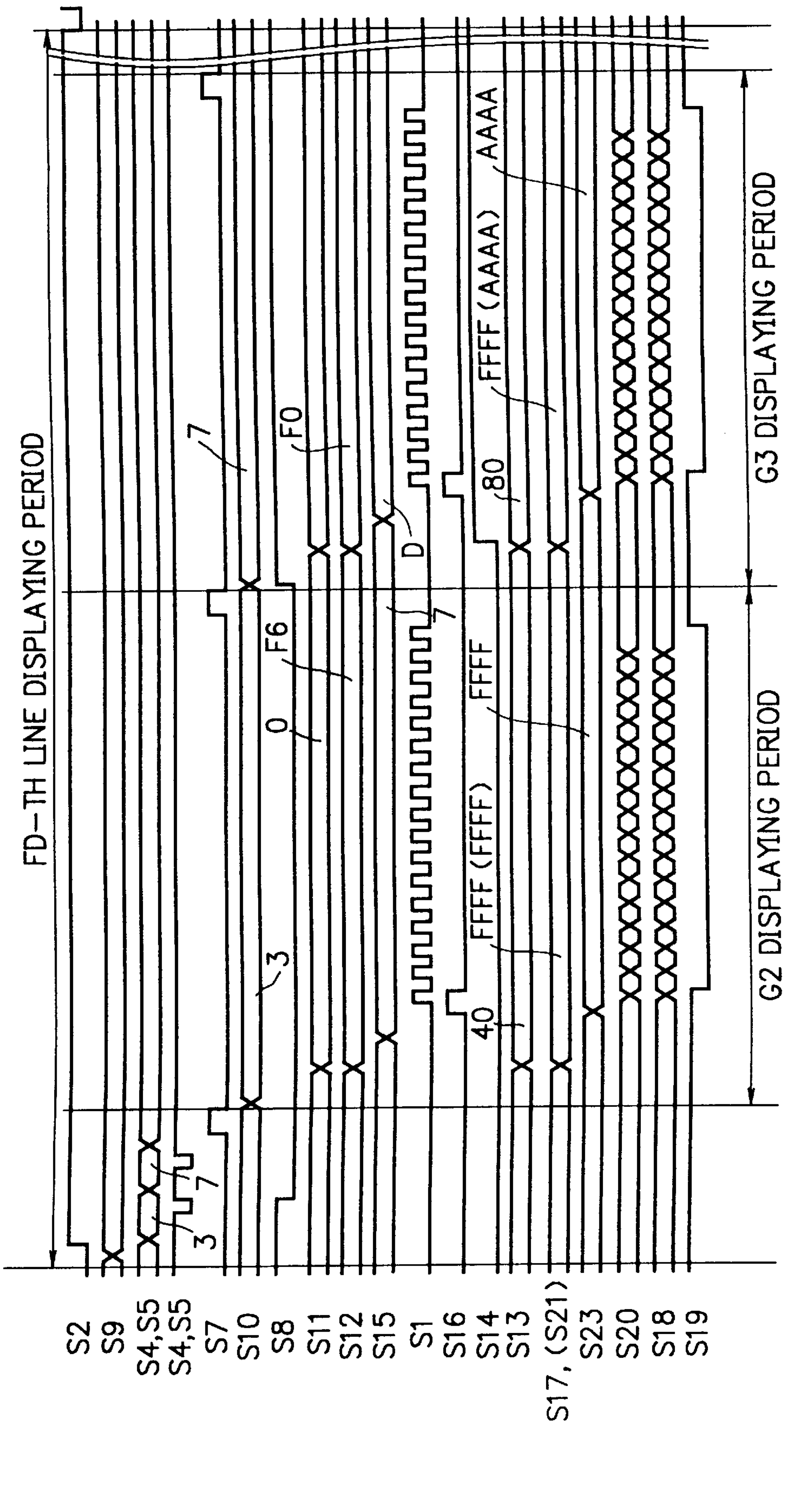
FIG. 12 is a timing chart showing timing of each signal in the graphic image display device of FIG. 9 during display operation of the FD-th line of the display screen.

In the following, the operation of the graphic image display device of this embodiment will be described. Incidentally, FIG. 3, FIG. 11 and FIG. 10 are common to the device of FIG. 9 and the device of this embodiment.

Figure 3:
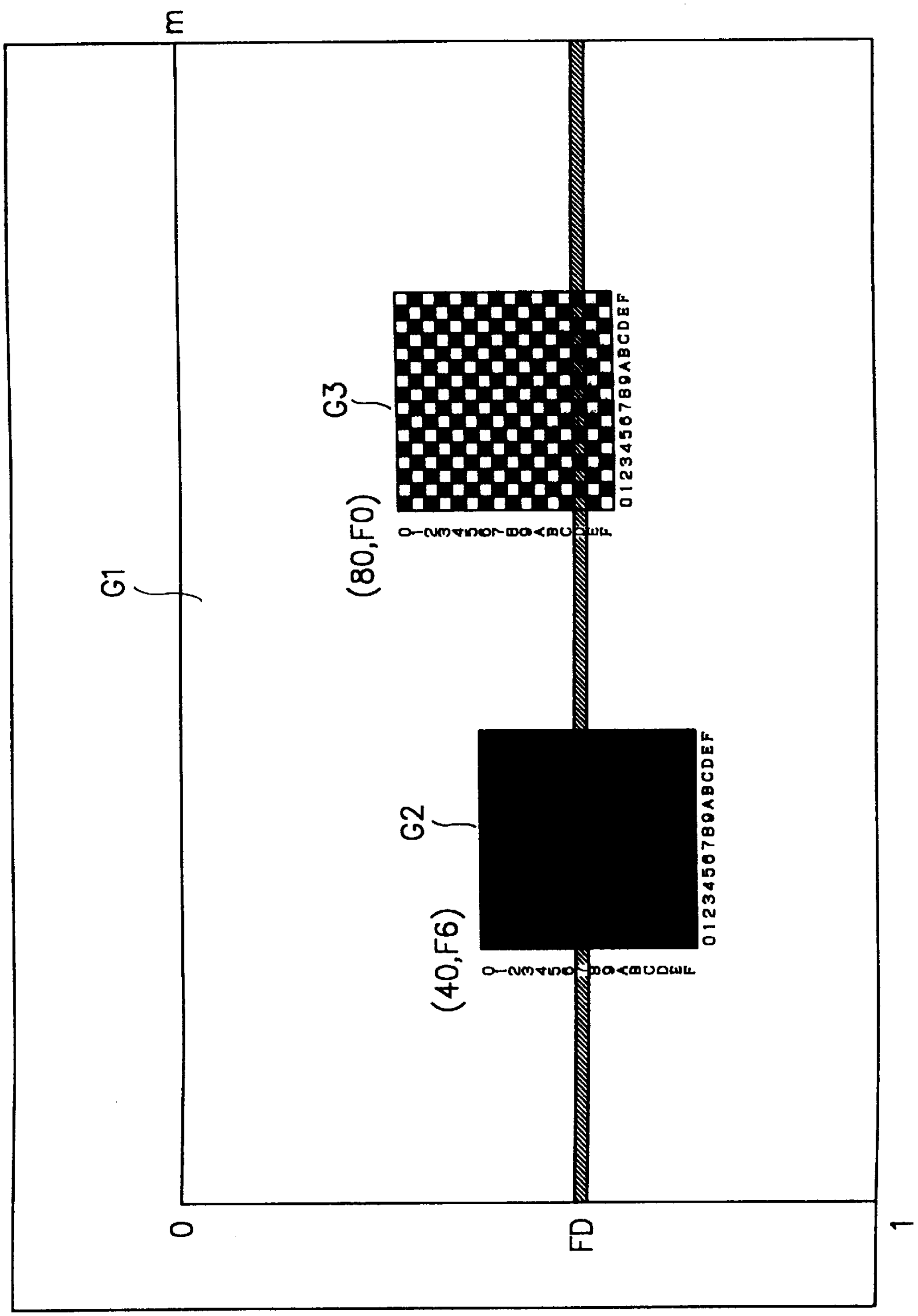
FIG. 3 is a schematic diagram showing an example of a graphic image display.
Figure 4:
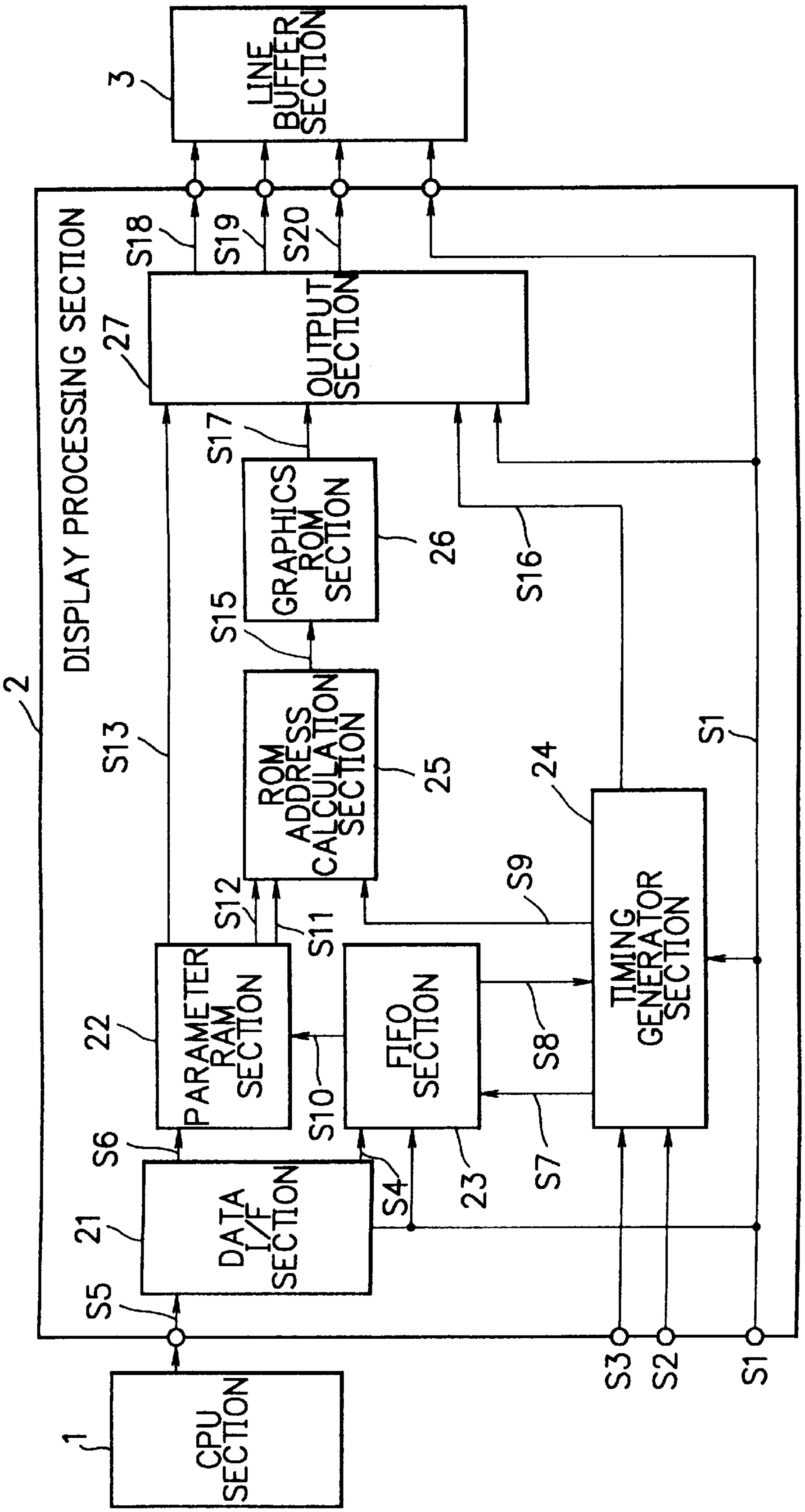
FIG. 4 is a block diagram showing composition of a general conventional graphic image display device.
Figure 5:
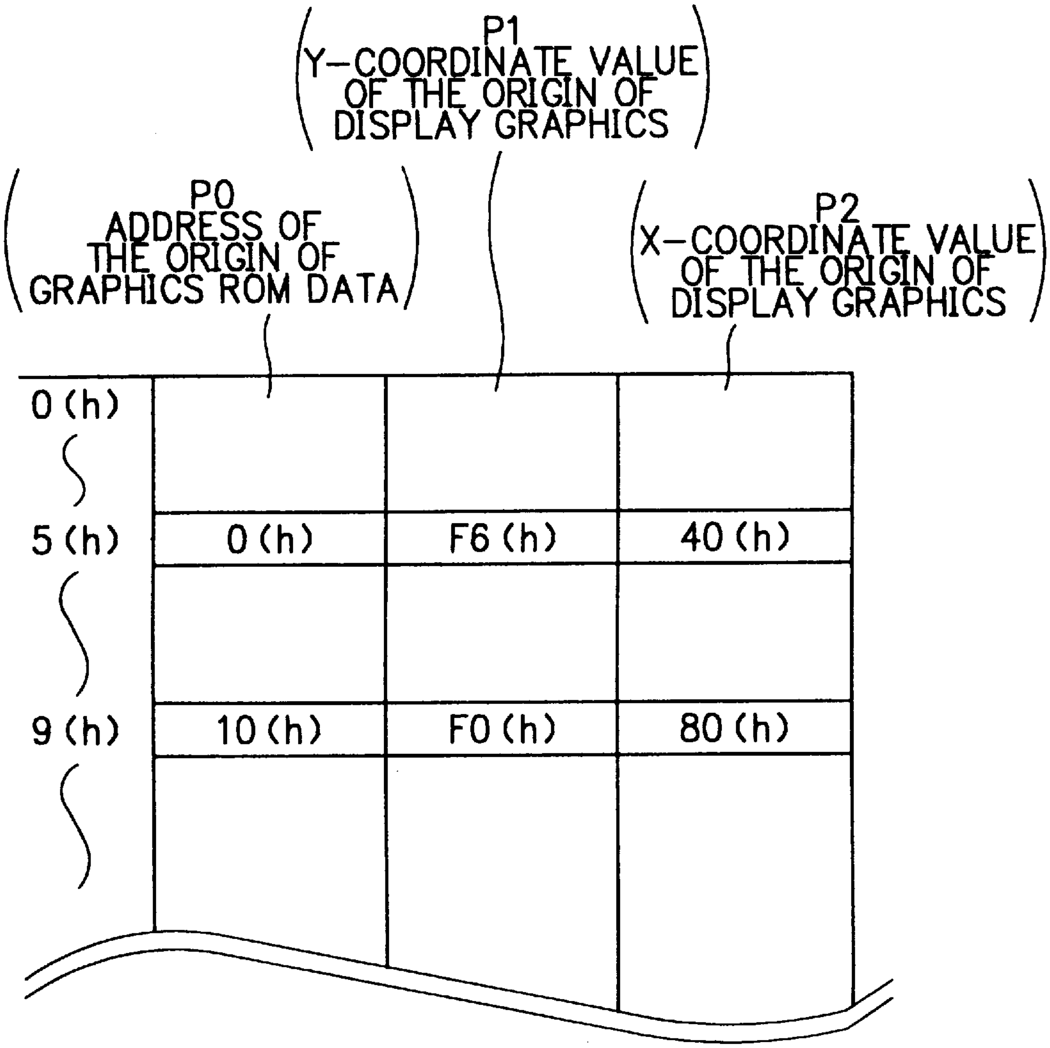
FIG. 5 is a schematic diagram showing a storage map of a parameter RAM section of the graphic image display device of FIG. 4.
Figure 6:
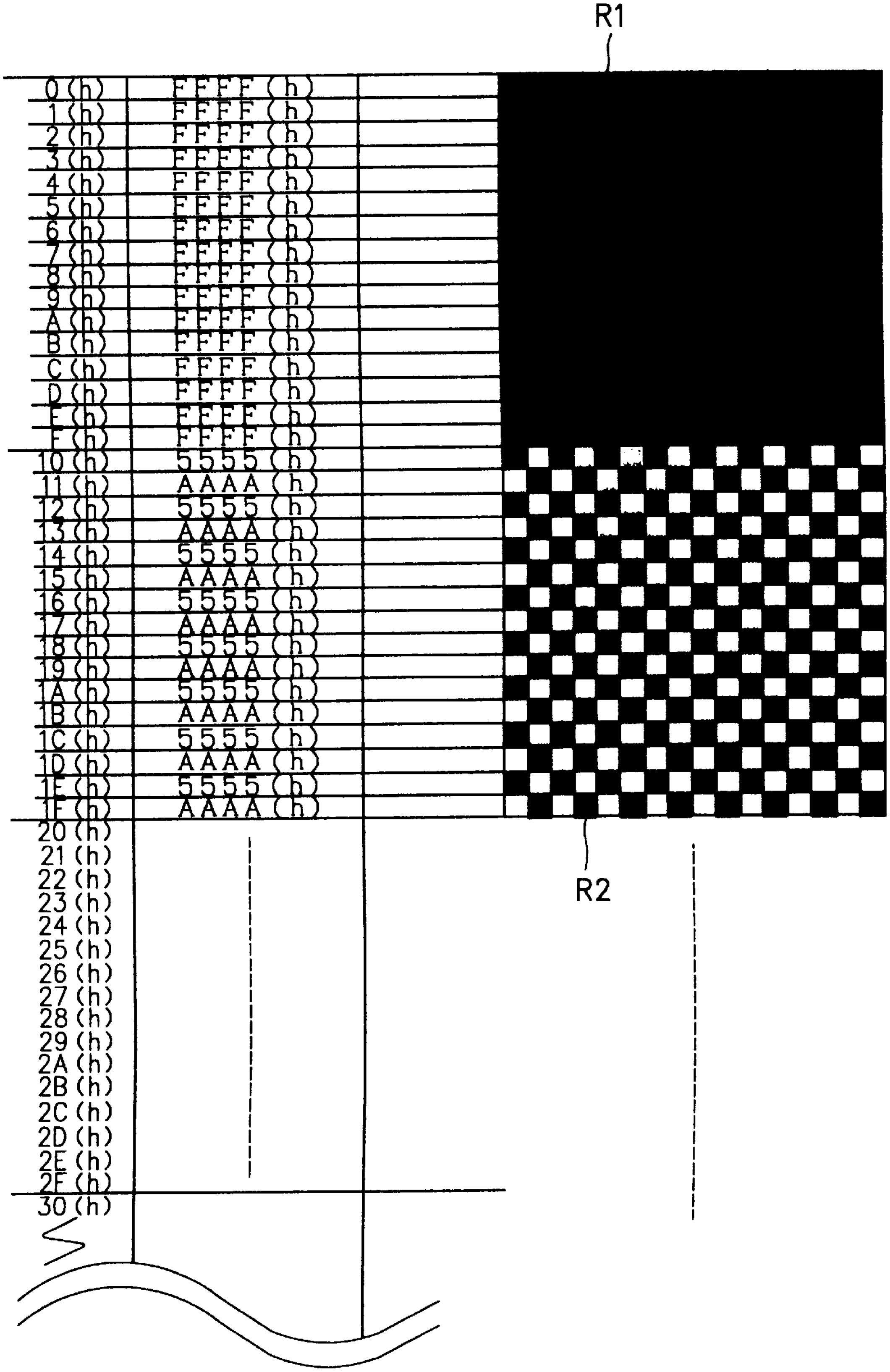
FIG. 6 is a schematic diagram showing a storage map of a graphics ROM section of the graphic image display device of FIG. 4.

Referring to FIG. 3. the display screen G1 is composed of 1×m dots (pixels), and is displaying, for example, graphics G2 which is composed of 16×16 pixels all in black levels and graphics G3 which is composed of black level pixels and white level pixels arranged alternately. The graphics G2 is realized by displaying graphics ROM data R1 shown in FIG. 11 on the display screen G1, putting the upper left origin (0(h),0(h)) of the graphics ROM data R1 at coordinates (40(h),F6(h)) of the display screen G1. The graphics G3 is realized by displaying the same original graphics ROM data R1 on the display screen G1, with executing masking operation to the graphics ROM data R1 by masking the line buffer write enable signal Sl9, putting the upper left origin (0(h),0(h)) of the masked graphics ROM data R1 at coordinates (80(h),F0(h)) of the display screen G1.

Referring again to FIG. 10 which is showing the storage map of the parameter RAM section 22, in order to display the graphics on the display screen G1 as shown in FIG. 3, the address of the origin of the graphics ROM data stored in the graphics ROM section 26 (see FIG. 11) is set as a value P0, the Y-coordinate value of the origin of the display graphics is set as a value P1, the X-coordinate value of the origin of the display graphics is set as a value P2, and ON/OFF information of mesh effect is set as a value P3. For example, the above four values P0, P1, P2 and P3 for the graphics G2 are set in an address 3(h) of the parameter RAM section 22. and the above four values P0, P1, P2 and P3 for the graphics G3 are set in an address 7(h) of the parameter RAM section 22.

Figure 7:
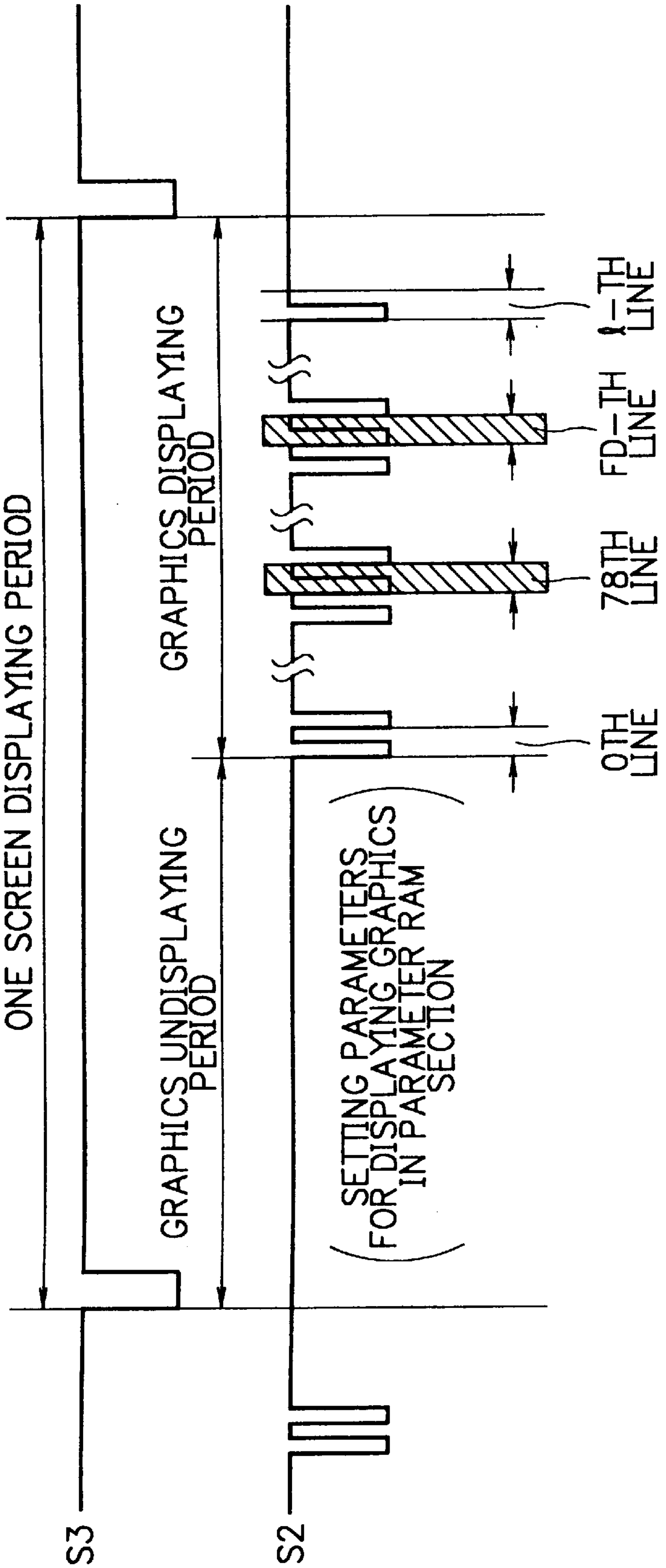
FIG. 7 is a timing chart showing timing of display operation of the graphic image display device of FIG. 4.
Figure 14:
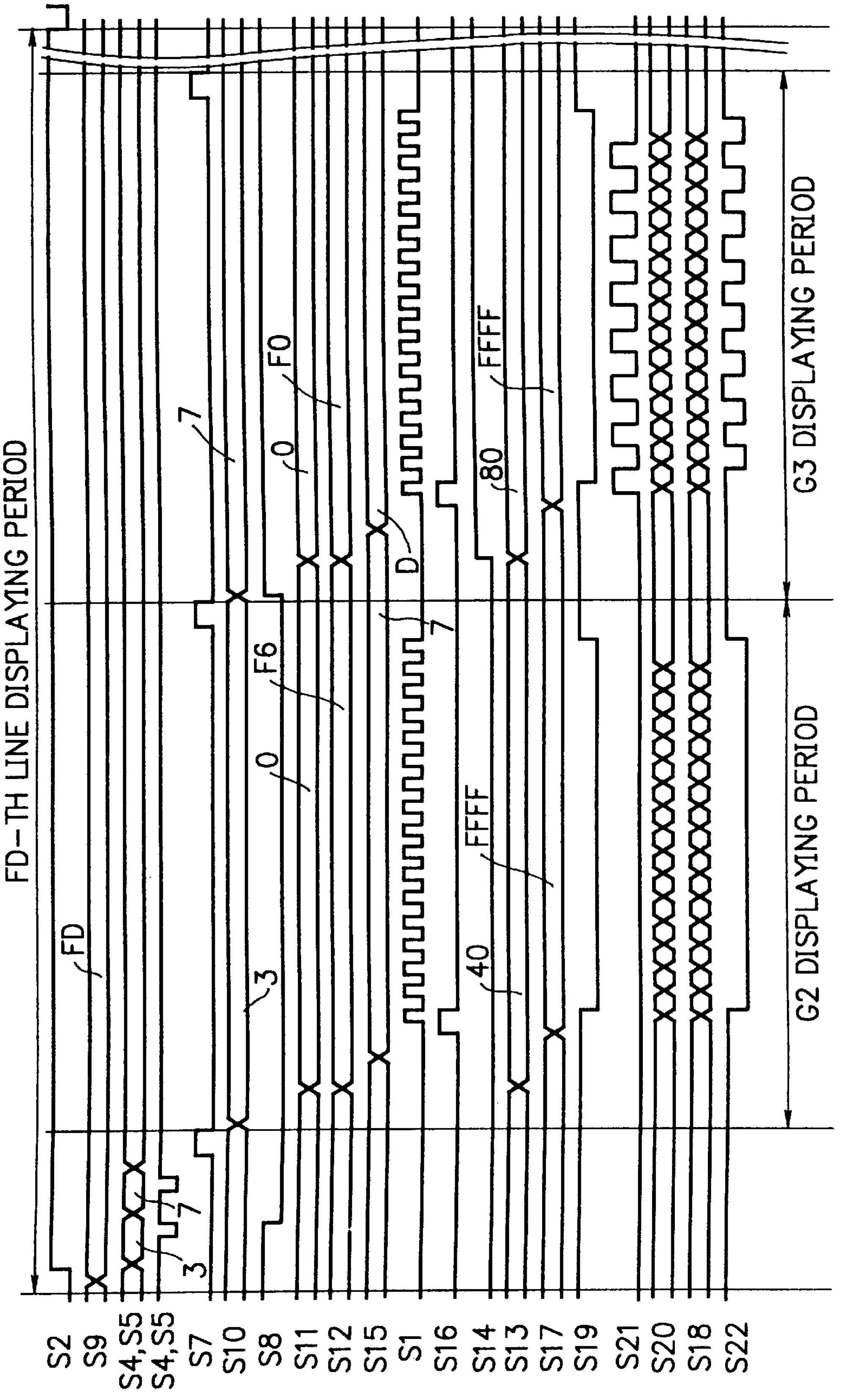
FIG. 14 is a timing chart showing timing of each signal in the graphic image display device of FIG. 13 during display operation of the FD-th line of the display screen.
Figure 15:
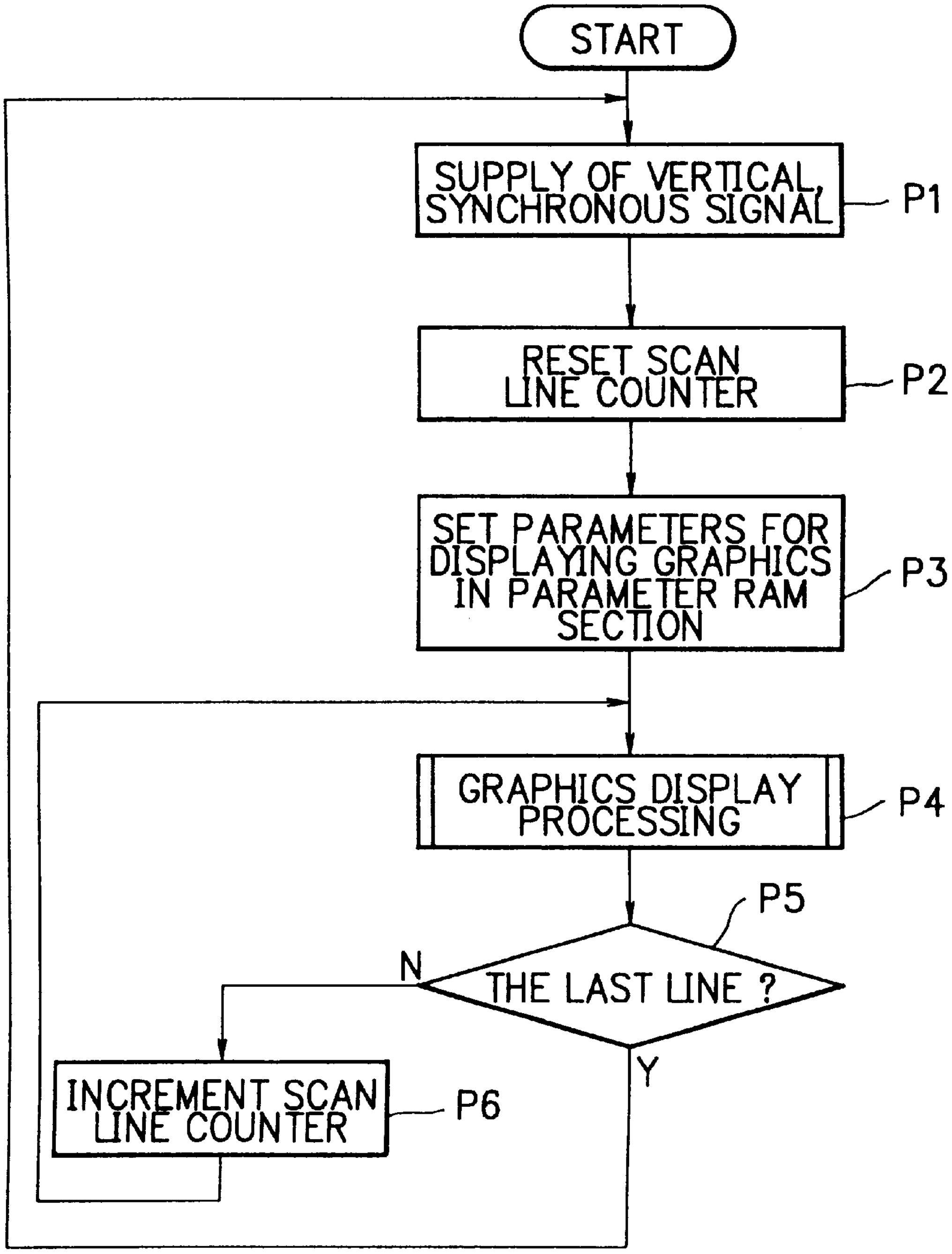
FIG. 15 is a flow chart showing the operation of the graphic image display device according to an embodiment of the present invention.
Figure 16:
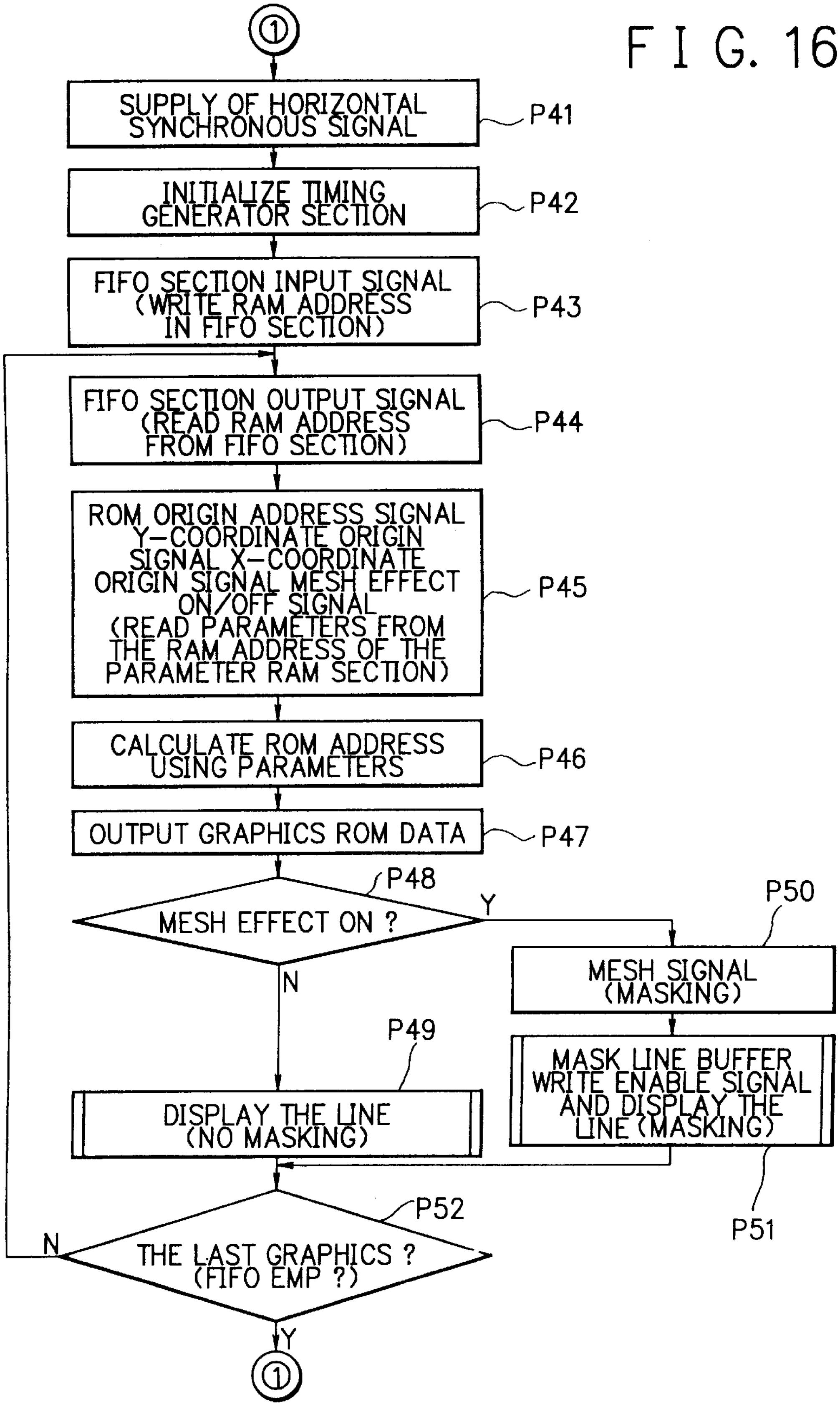
FIG. 16 is a flow chart showing steps in the graphics display processing in FIG. 15.

In the following, display processing for the FD-th line of the display screen G1 will be explained for example, referring to the block diagram FIG. 13, the storage map FIG. 10, timing charts FIG. 7 (one screen displaying period) and FIG. 14 (FD-th line displaying period), and flow charts FIG. 15 and FIG. 16. Incidentally, normal display of graphics is executed when P3=0, and mesh effect display of graphics is executed when P3=1 in this example.

First, the timing generator section 24 in the display processing section 2B is initialized according to supply of the vertical synchronous signal S3 to the display processing section 2B (step P1, P2). The data I/F section 21 is supplied with the CPU 1/F signal S5 from the CPU section 1 during the graphics undisplaying period shown in FIG. 7, identifies the instruction in the CPU I/F signal S5, and outputs the contents of the identified instruction into the parameter RAM section 22 as the parameter RAM write signal S6. Then, data P0=0(h), P1=F6(h), P2=40(h) and P3=0(h) are set in the address 3(h) of the parameter RAM section 22, and data P0=0(h), P1=F0(h), P2=80(h) and P3=1(h) are set in the address 7(h) of the parameter RAM section 22 (step P3).

Subsequently, graphics display processing (step P4) is executed. The timing generator section 24 counts the number of the supply of the horizontal synchronous signal S2 (falling edge), and the scan line count signal S9 is incremented on every supply (i.e. activation) of the horizontal synchronous signal S2 (step P41), and eventually, the scan line count signal S9 becomes FD(h). The timing generator section 24 is initialized on every supply of the horizontal synchronous signal S2 (step S42). Subsequently, the data I/F section 21 identifies the instruction in the CPU I/F signal S5 supplied from the CPU section 1, and stores the FIFO section input signal S4 (S4=3(h), 7(h)) in the FIFO section 23 in the order of display, according to the instruction in the CPU I/F signal S5 (step P43). The FIFO section 23 sets the FIFO section emp signal S8, which is supplied to the timing generator section 24, at 0(h) according to storage of data, and consequently, output of the FIFO section request signal S7 by the timing generator section 24 is enabled.

After the storing period of the FIFO section 23 is over, the timing generator section 2.1 supplies the FIFO section request signal S7 to the FIFO section 23, and according to the supply of the FIFO section request signal S7, the FIFO section 23 sends the FIFO section output signal S10 (S10=3(h)) to the parameter RAM section 22 as a reading address (step P44). Then, the parameter RAM section 22 outputs the ROM origin address signal S11 (P0=0(h)), the Y-coordinate origin signal S12 (P1=F6(h)), the X-coordinate origin signal S13 (P2=40(h)), and the mesh effect ON/OFF signal S14 (P3=0(h)), according to the supply of the FIFO section output signal S10=3(h) (step P45). Then, the ROM address calculation section 25 calculates a ROM address using the ROM origin address signal S11, the scan line count signal S9 and the Y-coordinate origin signal S12, and outputs the ROM address signal S15 (S15=7(h)) to the graphics ROM section 26. The ROM address is an address in the graphics ROM section 26 where the graphics data of a line of the graphics G2 which should be displayed on the FD-th line of the display screen G1 is stored (step P46). Then, the graphics ROM section 26 outputs the graphics data signal S17 (S17=FFFF(h)) corresponding to the supplied ROM address signal S15=7(h) into the output section 27 (step P47).

Subsequently, the timing generator section 24 sends the display start signal S16 to the output section 27. Then, according to the supply of the display start signal S16, the output section 27 increments the line buffer address signal S20 which is supplied to the line buffer section 3 from 40(h) to 4F(h) (see FIG. 3) on every supply of the clock signal S1. The output section 27 also supplies the line buffer section 3 with each bit of the line buffer data signal S18 (S18=1111111111111111) on every supply of the clock signal S1. The line buffer write enable signal S19, which is generally set at 1(h), is set at 0(h) while the line buffer address signal S20 is outputted and incremented.

According to the mesh effect ON/OFF signal S14=0(h) supplied from the parameter RAM section 2, the mesh pattern generator section 28B generates the mesh signal S21 (S21=FFFF(h) and outputs each bit of the mesh signal S21 (S21=FFFF(h)) to the write enable mask section 30 on every supply of the clock signal S1. Each bit '1' in the mesh signal S21=FFFF(h) (1111111111111) is an instruction not to execute masking to each bit of the line buffer write enable signal S19 (step P48). According 0o the supplied mesh signal S21=FFFF(h), the write enable mask section 30 executes no masking to the line buffer write enable signal S19 supplied from the output section 27, and supplies the line buffer write enable signal S19 into the line buffer section 3 as the masked line buffer write enable signal S22.

The display processing section 2B stores the graphics data of the line of the graphics G2 in the line buffer section 3 as described above.

On the storage of the graphics data, the timing generator section 24 sends the FIFO section request signal S7 to the FIFO section 23. The FIFO section 23 outputs the FIFO section output signal S10 (S10=7(h)) to the parameter RAM section 22, according to the supply of the FIFO section request signal S7 (step P44). The FIFO section 23 which has become empty by the output of the data 7(h) sends the FIFO section emp signal S8 (S8=1(h)) to the timing generator section 24. According to the supply )f the FIFO section output signal S10=7(h) as a reading address, the parameter RAM section 22 outputs the ROM origin address signal S11 (P0=0(h)), the Y-coordinate origin signal S12 (P1=F0(h)), the X-coordinate origin signal S13 (P2=80(h)), and the mesh effect ON/OFF signal S14 (P3=1(h)) (step P45). Then, the ROM address calculation section 25 calculates a ROM address using the ROM origin address signal S11, the scan line count signal S9 and the Y-coordinate origin signal S12, and outputs the ROM address signal S15 (S15=D(h)) to the graphics ROM section 26 (step P46). Then, the graphics ROM section 26 outputs the graphics data signal S17 (S17=FFFF(h)), corresponding to the supplied ROM address signal S15=D(h), into the output section 27 (step P47).

Subsequently, the timing generator section 24 sends the display start signal S16 to the output section 27 again. Then, according to the supply of the display start signal S16, the output section 27 increments the line buffer address signal S20 which is supplied to the line,e buffer section 3 from 80(h) to 8F(h) (see FIG. 3) on every supply of the clock signal S1. The output section 27 also supplies the line buffer section 3 with each bit of the line buffer data signal S18 (S18=1111111111111111) on every supply of the clock signal S1. The line buffer write enable signal S19, which is generally set at 1(h), is set at 0(h) while the line buffer address signal S20 is outputted and incremented.

Subsequently, according to the mesh effect ON/OFF signal S14=1(h), the scan line count signal S9 and the ROM address signal S15=D(h), the mesh pattern generator section 28B generates the mesh signal S21 (S21=0101010101010101) and outputs each bit of the mesh signal S21 (S21=0101010101010101) into the write enable mask section 30 on every supply of the clock signal S1. Each bit '0' in the mesh signal S21=0101010101010101 is an instruction to execute masking to each bit of the line buffer write enable signal S19 (step P50). The write enable mask section 30 executes masking to the line buffer write enable signal S19 according to each bit of the mesh signal S21 and generates the masked line buffer write enable signal S22, and supplies the signal S22 to the line buffer section 3. Writing into the line buffer section 3 is executed only when the masked line buffed write enable signal S22 is in a low level (step P51).

The display processing section 2B stores the graphics data of the line of the graphics G3 in the line buffer section 3 as described above (step P51). Then, the timing generator section 24 disables output of the next FIFO section request signal S7 since the FIFO section 23 is outputting the FIFO section emp signal S8=1(h) at that time, and display processing of the FD-th line of the display screen G1 is completed (step P52).

The above graphics display processing is executed until the last line of the display screen is displayed (step P4, P5, P6), and process is returned to the step P1 for displaying the next display screen.

As described above, according to the embodiment, ON/OFF of writing of each bit of graphics data into the line buffer section 3 can be controlled by executing masking to the line buffer write enable signal S19 according to the mesh signal 21 generated by the mesh pattern generator section 28B.

Figure 2:
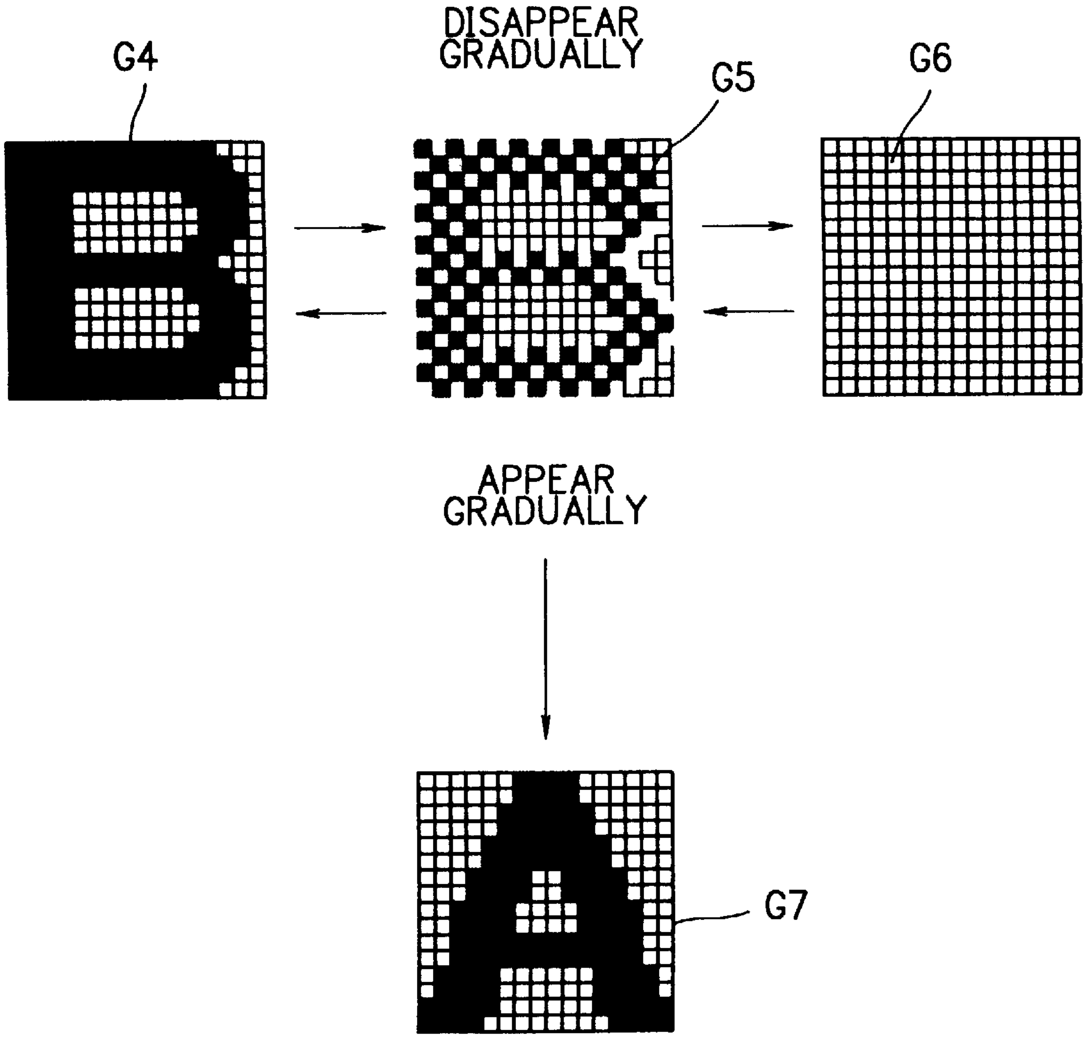
FIG. 2 is a schematic diagram showing an example of functions of mesh effect display.

Therefore, by the graphic image display device according to the embodiment, it is possible to execute overlapping display of mesh effect graphics. For example, in the case where the letter 'B' (graphics G4) gradually goes out via graphics G5 (mesh effect display of the letter 'B') (fade-out), and the letter 'A' (graphics G7) gradually appears in the same display area G6 (fade-in) as shown in FIG. 2, it is possible to display the letter 'A' (graphics G7) overlapped on the mesh effect graphics G5 in transitional display, and thus smooth transition of display graphics can be executed.

Figure 17:
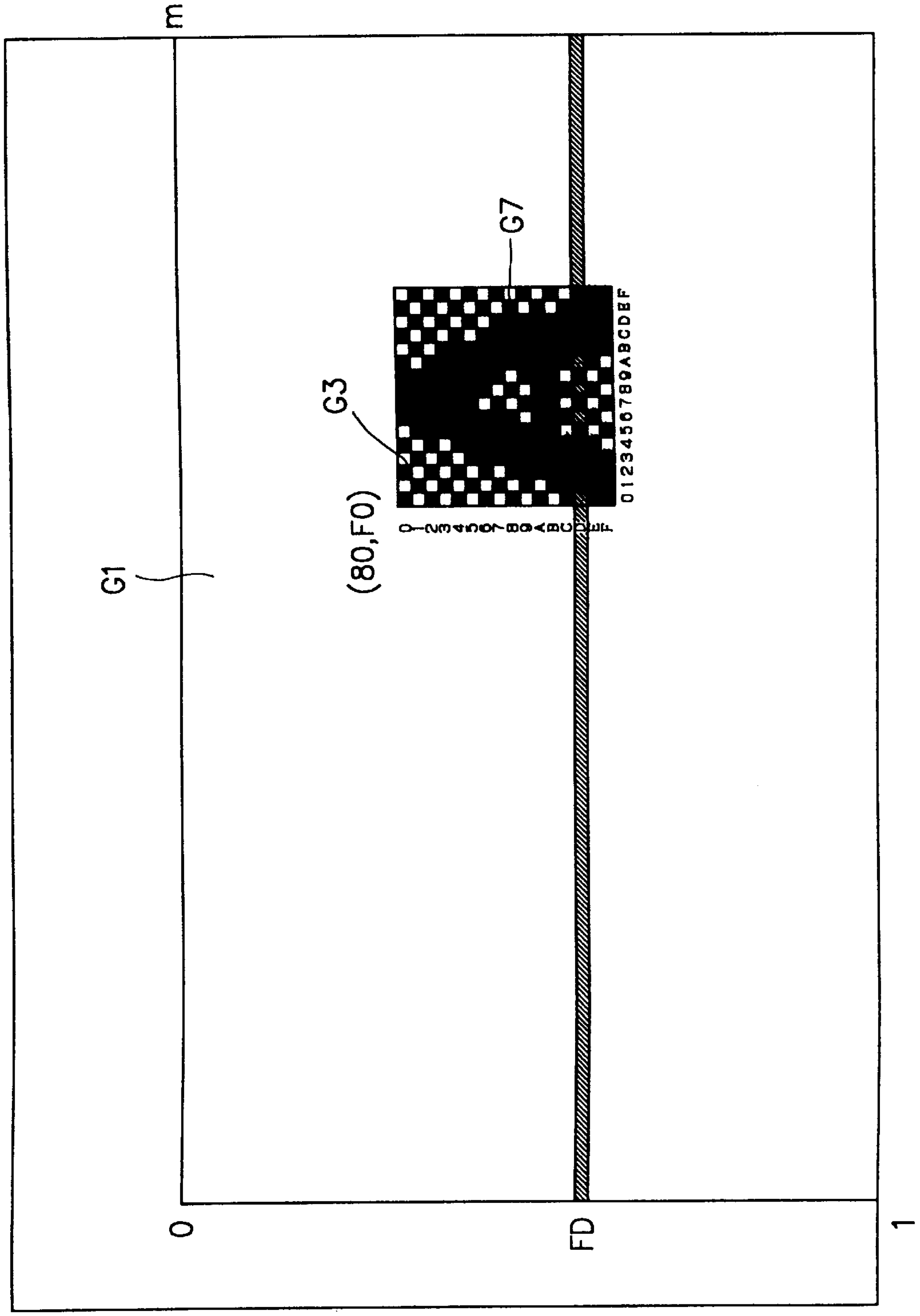
FIG. 17 is a schematic diagram showing an example of a transitional graphic image display executed by the graphic image display device of FIG. 13.

In the following, the operation of the graphic image display device for executing the transitional display will be described. FIG. 17 is a schematic diagram showing an example of a transitional graphic image display, and FIG. 18 is a schematic diagram showing a storage map of the graphics ROM section 26.

Figure 18:
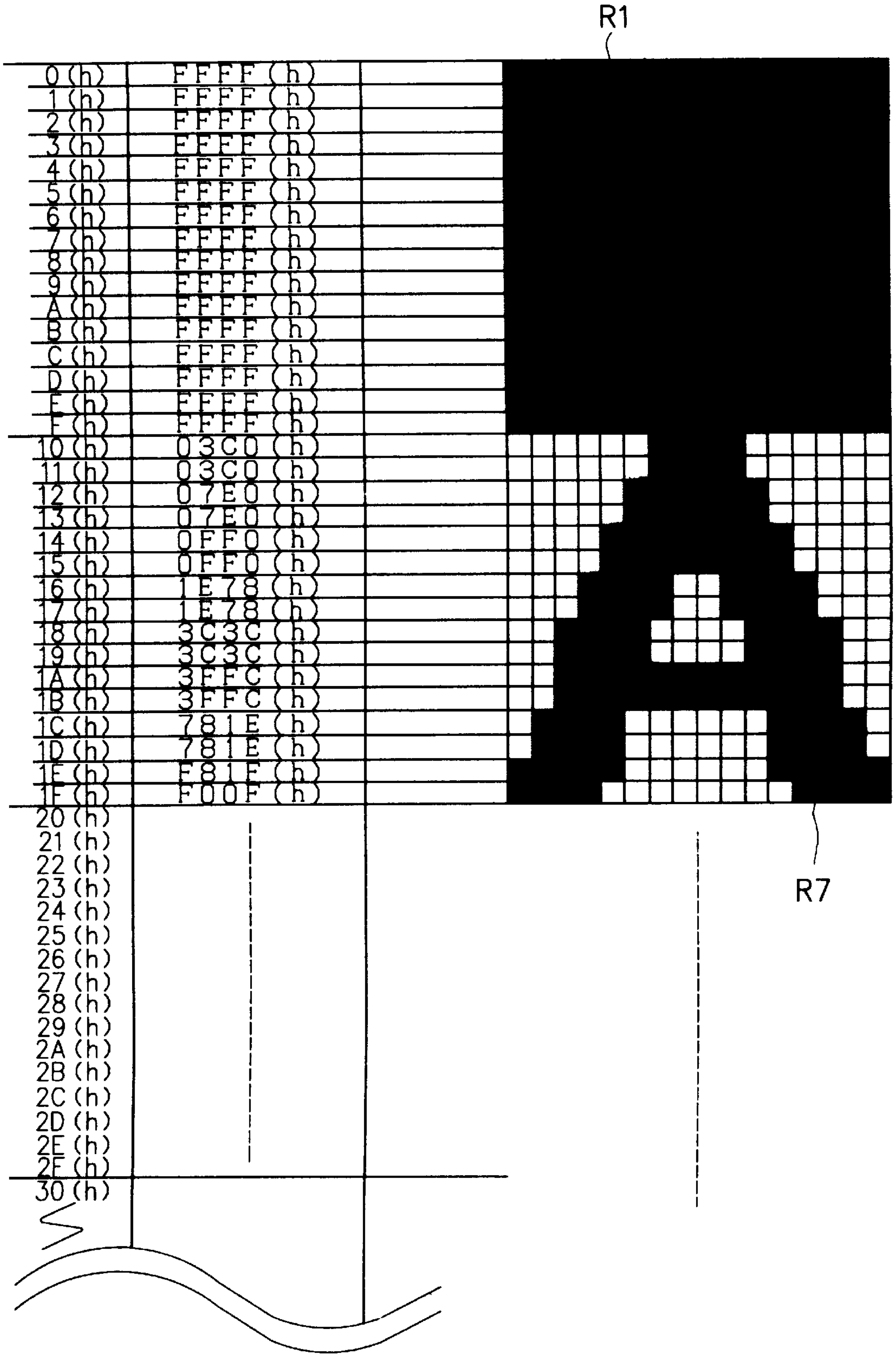
FIG. 18 is a schematic diagram showing a storage map of a graphics ROM section of the graphic image display device of FIG. 13 for executing the transitional graphic image display of FIG. 17.

Referring to FIG. 17 and FIG. 18, the display screen G1 composed of 1×m dots (pixels) is displaying, for example, graphics G3 which is composed of black level pixels and white level pixels arranged alternately and graphics G7 (the letter 'A' shown in FIG. 2) together (transitional display). The graphics G3 is realized by displaying the graphics ROM data R1 on the display screen G1, with executing masking operation to the graphics ROM data R1 by masking the line buffer write enable signal S19, putting the upper left origin (0(h),0(h)) of the masked graphics ROM data R1 at coordinates (80(h),F0(h)) of the display screen G1. The graphics G7 is realized by displaying graphics ROM data R7 shown in FIG. 18 on the display screen G1, putting the upper left origin (0(h),0(h)) of the graphics ROM data R7 at coordinates (80(h),F0(h)) of the display screen G1.

Figure 8:
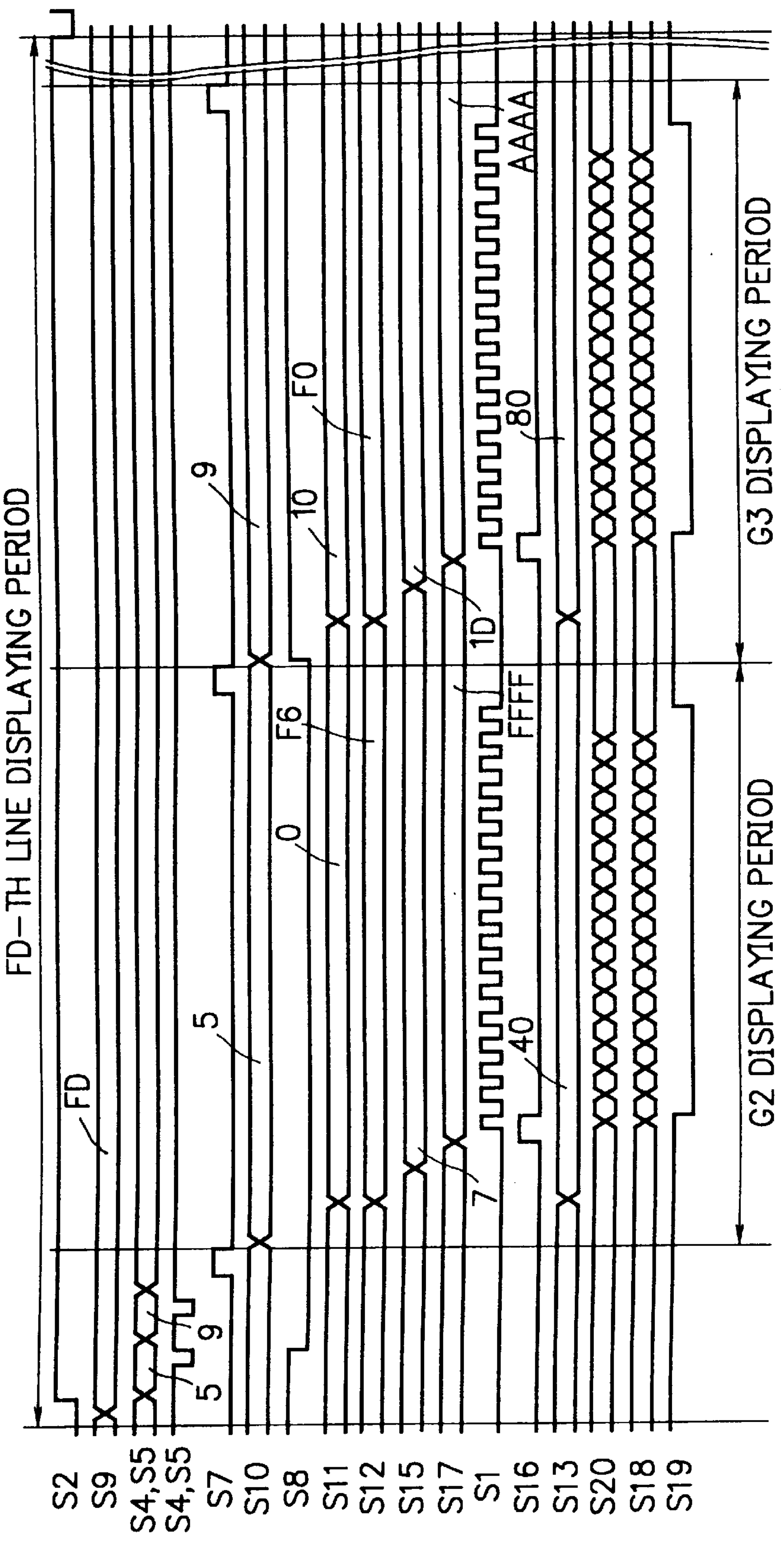
FIG. 8 is a timing chart showing timing of each signal in the graphic image display device of FIG. 4 during display operation of the FD-th line of the display screen.
Figure 19:
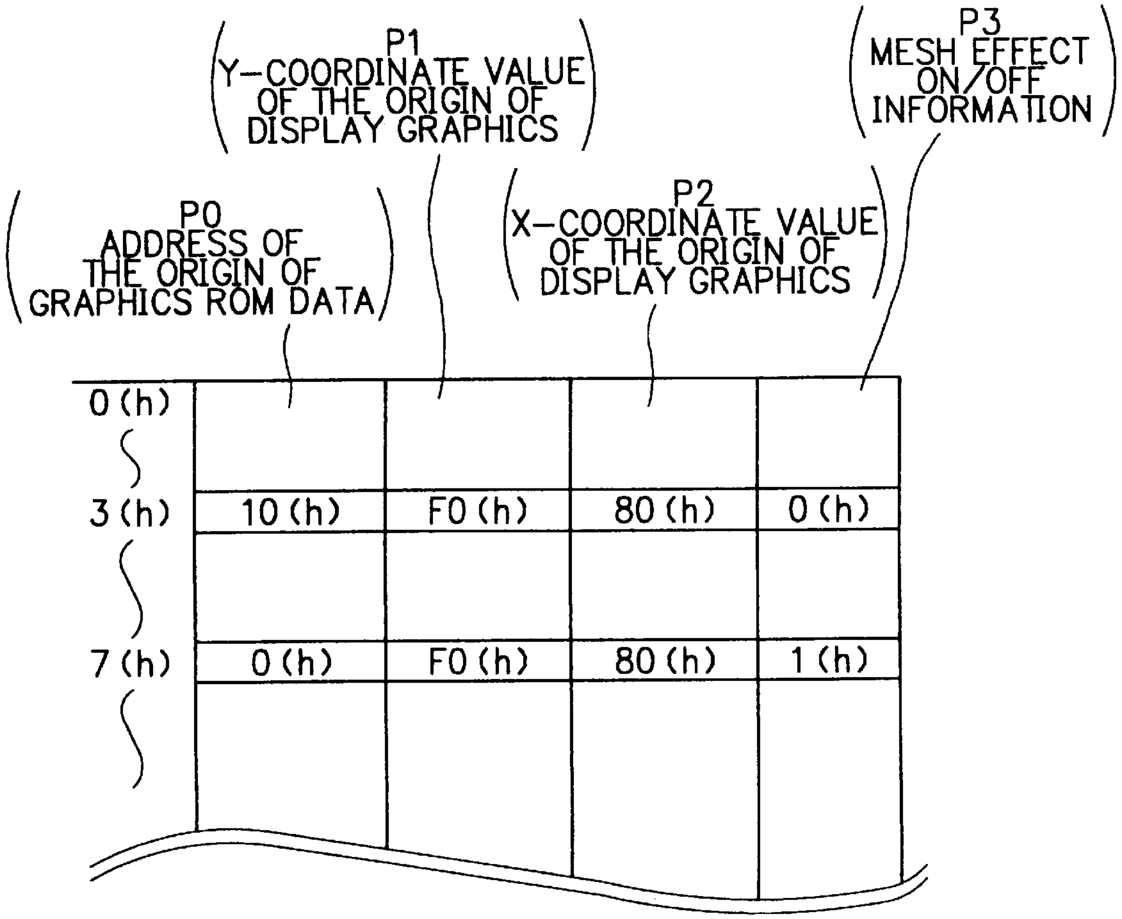
FIG. 19 is a schematic diagram showing a storage map of a parameter RAM section of the graphic image display device of FIG. 9 when the transitional graphic image display of FIG. 17 is executed.

Referring to FIG. 19 which is showing the storage map of the parameter RAM section 22, in order to execute transitional display on the display screen G1 as shown in FIG. 17, the address of the origin of the graphics ROM data stored in the graphics ROM section 26 (see FIG. 8) is set as a value P0, the Y-coordinate value of the origin of the display graphics is set as a value P1, the X-coordinate value of the origin of the display graphics is set as a value P2, and ON/OFF information of mesh effect is set as a value P3. For example, the above four values P0, P1, P2 and P3 for the graphics G7 are set in an address 3(h) of the parameter RAM section 22, and the above four values P0, P1, P2 and P3 for the graphics G3 are set in an address 7(h) of the parameter RAM section 22.

First, the timing generator section 24 in the display processing section 2B is initialized according to supply of the vertical synchronous signal S3 to the display processing section 2B (step P1, P2). The data I/F section 21 is supplied with the CPU I/F signal S5 from the CPU section 1 during the graphics undisplaying period shown in FIG. 7, identifies the instruction in the CPU I/F signal S5, and outputs the contents of the identified instruction into the parameter RAM section 22 as the parameter RAM write signal S6. Then, data P0=10(h), P1=F0(h), P2=80(h) and P3=0(h) are set in the address 3(h) of the parameter RAM section 22, and data P0=0(h), P1=F0(h), P2=80(h) and P3=1(h) are set in the address 7(h) of the parameter RAM section 22 (step P3).

Subsequently, graphics display processing (step P4) is executed. The timing generator section 24 counts the number of the supply of the horizontal synchronous signal S2 (falling edge), and the scan line count signal S9 is incremented on every supply of the horizontal synchronous signal S2 (step P41), and eventually, the scan line count signal S9 becomes FD(h). The timing generator section 24 is initialized on every supply of the horizontal synchronous signal S2 (step S42). Subsequently, the data I/F section 21 identifies the instruction in the CPU I/F signal S5 supplied from the CPU section 1, and stores the FIFO section input signal S4 (S4=3(h), 7(h)) in the FIFO section 23 in the order of display (step P43). The FIFO section 23 sets the FIFO section emp signal S8 at 0(h) according to storage of data, and consequently, output of the FIFO section request signal S7 by the timing generator section 24 is enabled.

After the storing period of the FIFO section 23 is over, the timing generator section 24 supplies the FIFO section request signal S7 to the FIFO section 23, and the FIFO section 23 sends the FIFO section output signal S10 (S10=3(h)) to the parameter RAM section 22 as a reading address (step P44). Then, the parameter RAM section 22 outputs the ROM origin address signal S11 (P0=10(h)), the Y-coordinate origin signal S12 (P1=F0(h)), the X-coordinate origin signal S13 (P2=80(h)), and the mesh effect ON/OFF signal S14 (P3=0(h)) (step P45). Then, the ROM address calculation section 25 calculates a ROM address using the ROM origin address signal S11, the scan line count signal S9 and the Y-coordinate origin signal S12, and outputs the ROM address signal S15 (S15=1D(h)) to the graphics ROM section 26. The ROM address is an address in the graphics ROM section 26 where the graphics data of a line of the graphics G7 which should be displayed on the FD-th line of the display screen G1 is stored (step P46). Then, the graphics ROM section 26 outputs the graphics data signal S17 (S17=781E(h)) corresponding to the supplied ROM address signal S15=1D(h) into the output section 27 (step P47).

Subsequently, the timing generator section 24 sends the display start signal S16 to the output section 27. Then, according to the signal S16, the output section 27 increments the line buffer address signal S20 which is supplied to the line buffer section 3 from 80(h) to 8F(h) (see FIG. 17) on every supply of the clock signal S1. The output section 27 also supplies the line buffer section 3 with each bit of the line buffer data signal S18 (S18=0111100000011110) on every supply of the clock signal S1. The line buffer write enable signal S19, which is generally set at 1(h), is set at 0(h) while the line buffer address signal S20 is outputted and incremented.

According to the mesh effect ON/OFF signal S14=0(h) supplied from the parameter RAM section 22, the mesh pattern generator section 28B generates the mesh signal S21 (S21=FFFF(h)) and outputs each bit of the mesh signal S21 (S21=FFFF(h)) to the write enable mask section 30 on every supply of the clock signal S1. Each bit '1' in the mesh signal S21=FFFF(h) (111111111111) is an instruction not to execute masking to each bit of the line buffer write enable signal S19 (step P48). According to the supplied mesh signal S21=FFFF(h), the write enable mask section 30 executes no masking to the line buffer write enable signal S19 supplied from the output section 27, and supplies the line buffer write enable signal S19 into the line buffer section 3 as the masked line buffer write enable signal S22.

The display processing section 2B stores the graphics data of the line of the graphics G7 in the line buffer section 3 as described above.

On the storage of the graphics data, the timing generator section 24 sends the FIFO section request signal S7 to the FIFO section 23, and the FIFO section 23 outputs the FIFO section output signal S10 (S10=7(h)) to the parameter RAM section 22 (step P44). The FIFO section 23 which has become empty by the output of the data 7(h) sends the FIFO section emp signal S8 (S8=1(h)) to the timing generator section 24. According to the supply of the FIFO section output signal S10=7(h) as a reading address, the parameter RAM section 22 outputs the ROM origin address signal S11 (P0=0(h)), the Y-coordinate origin signal S12 (P1=F0(h)), the X-coordinate origin signal S13 (P2=80(h)), and the mesh effect ON/OFF signal S14 (P3=1(h)) (step P45). Then, the ROM address calculation section 25 calculates a ROM address using the ROM origin address signal S11, the scan line count signal S9 and the Y-coordinate origin signal S12, ind outputs the ROM address signal S15 (S15=D(h)) to the graphics ROM section 26 (step P46). Then, the graphics ROM section 26 outputs the graphics data signal S17 (S17=FFFF(h)), corresponding to the supplied ROM address signal S15=D(h), into the output section 27 (step P47).

Subsequently, the timing generator section 24 sends the display start signal S16 to the output section 27 again. Then, the output section 27 increments the line buffer address signal S20 which is supplied to the line buffer section 3 from 80(h) to 8F(h) (see FIG. 17) on every supply of the clock signal S1. The output section 27 also supplies the line buffer section 3 with each bit of the line buffer data signal S18 (S18=1111111111111) on every supply of the clock signal S1. The line buffer write enable signal S19, which is generally set at 1(h), is set at 0(h) while the line buffer address signal S20 is outputted and incremented.

Subsequently, according to the mesh effect ON/OFF signal S14=1(h), the scan line count signal S9 and the ROM address signal S15=D(h). the mesh pattern generator section 28B generates the mesh signal S21 (S21=0101010101010101) and outputs each bit of the mesh signal S21 (S21=0101010101010101) into the write enable mask section 30 on every supply of the clock signal S1. Each bit '0' in the mesh signal S21=0101010101010101 is an instruction to execute masking to each bit of the line buffer write enable signal S19 (step P50). The write enable mask section 30 executes masking to the line buffer write enable signal S19 according to each bit of the mesh signal S21 and generates the masked line buffer write enable signal S22, and supplies the signal S22 to the line buffer section 3. Writing into the line buffer section 3 is executed only when the masked line buffer write enable signal S22 is in a low level (step P51).

The display processing section 2B stores the graphics data of the line of the graphics G3 in the line buffer section 3 which has been storing the graphics data of the line of the graphics G7, as described above. When the graphics data of graphics G3 is overwritten on the graphics data of graphics G7 stored in each address of the line buffer section 3, bits of the line buffer data signal S13 corresponding to the masked line buffer write enable signal S22=0 are overwritten in corresponding addresses of the line buffer section 3, and bits of the line buffer data signal S18 corresponding to the masked line buffer write enable signal S22=1 are not overwritten in the line buffer section 3, and thus bits of the graphics data of the graphics G7 which have been stored in the line buffer section 3, to which the overwriting is not executed, remain in the line buffer section 3 unerased, and are displayed on the display screen G1 with the graphics G3, as shown in FIG. 17 step P51).

Then, the timing generator section)n 24 disables output of the next FIFO section request signal S7 since the FIFO section 23 is outputting the FIFO section emp signal S8=1 (h) at that time, and display processing of the FD-th line of the display screen G1 is completed (step P52).

The above graphics display processing is executed until the last line of the display screen is displayed (step P4, P5, P6), and process is returned to the step P1 for displaying the next display screen.

As shown above, by the graphic image display device according to the embodiment, overlapping display of mesh effect graphics can be executed and transition of display graphics can be executed smoothly, without preparation of huge amount of graphics data or large capacity of the graphics ROM section 26.

Incidentally, although an example of transitional display has been explained, various kinds of transitional displays can be executed according to the embodiment. For example, in the case where graphics Gb is replaced with graphics Ga (fade-out/fade-in), various kinds of transitional displays and variations are possible according to the embodiment as follows:

| | | |
|---|---|---|
| [Gb] | → | [Gb(mesh)+Ga]→ [Ga], |
| [Gb] | → | [Gb+Ga(mesh)]→ [Ga], |
| [Gb] | → | [Gb+Ga(mesh)]→ [Gb(mesh)+Ga]→ [Ga], |
| [Gb] | → | [Gb(mesh)+Ga]→ [Gb+Ga(mesh)]→ [Ga], |
| [Gb] | → | [Gb(mesh)+Ga(mesh)]→ [Ga], |
| [Gb] | → | [Gb+Ga(mesh)]→ [Gb(mesh)+Ga(mesh)] → [Gb(mesh)+Ga]→ [Ga], etc. |

Furthermore, the mesh pattern generated by the mesh pattern generator section 28B is not limited to the checker pattern shown in FIG. 17. Various types of mesh patterns such as patterns shown in FIG. 1. are possible. It is also possible to let the mesh pattern generator section 28B generate a plurality of mesh patterns and switch mesh patterns according to instruction in the CPU I/F signal S5.

As set forth hereinabove, in the device and the method for displaying graphic images according to the present invention, by executing masking to the line buffer write enable signal, overwriting of graphics data into the line buffer section leaving part of previously stored graphics data unerased is made possible, thereby overlapping display of mesh effect graphics and smooth transitional display of graphics are made possible, without preparation of huge amount of graphics data in the graphics ROM section.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A graphic image display devise comprising:

a display processing section having a graphics ROM for storing original graphics data of a plurality of graphic images, reading original graphics data of a graphic image from the graphics ROM according to a CPU I/F signal supplied from a CPU as graphics processing control information, processing the original graphics data according to the CPU I/F signal and generating display graphics data, and outputting the display graphics data; and a line buffer section for temporarily storing the display graphics data to be displayed on a line of a display screen, wherein the display processing section includes:

a mesh pattern generator means for generating a mesh signal including masking information of a mesh pattern to be given to the display graphics data according to a mesh effect ON/OFF signal which is generated according to instructions in the CPU I/F signal; and a line buffer write control means for controlling ON/OFF of writing on the storing of the display graphics data in the line buffer section according to the mesh signal and thereby giving mesh effect to the display graphics data and realizing mesh effect display.

2. A graphic image display device as claimed in claim 1, wherein the line buffer write control means includes a write enable mask section for executing masking to a line buffer write enable signal which enables writing into the line buffer section, according to the value of the mesh signal.

3. A graphic image display device as claimed in claim 1, wherein the display processing section includes:

a data I/F section for receiving the CPU I/F signal, identifying instructions in the CPU I/F signal, and outputting a FIFO section input signal and a parameter RAM write signal corresponding to each display graphics according to the instructions in the CPU I/F signal;

a parameter RAM section for storing each graphic display parameter according to the parameter RAM write signal, and outputting a ROM origin address signal indicating an address of the origin of the original graphics data of a graphic image stored in the graphics ROM, a X-coordinate origin signal indicating a X-coordinate of the origin of the graphic image to be displayed on the display screen, a Y-coordinate origin signal indicating a Y-coordinate of the origin of the graphic image to be displayed on the display screen, and the mesh effect ON/OFF signal indicating ON/OFF of the mesh effect, according to supply of a FIFO section output signal;

a FIFO section for storing addresses of the parameter RAM section according to the FIFO section input signal, and outputting the FIFO section output signal according to supply of a FIFO section request signal;

a timing generator section for receiving a vertical synchronous signal and a horizontal synchronous signal from a system which uses the graphic image display device, counting the number of scan lines, outputting a scan line count signal, generating the FIFO section request signal requesting the FIFO section to output an address of the parameter RAM section, and generating a display start signal;

a ROM address calculation section for calculating a ROM address using the ROM origin address signal, the scan line count signal and the Y-coordinate origin signal, and outputting a ROM address signal;

a graphics ROM section provided with the graphics ROM for outputting a graphics data signal according to the ROM address signal; and an output section for receiving the graphics data signal and the X-coordinate origin signal, and outputting a line buffer data signal, a line buffer write enable signal, and a line buffer address signal, according to supply of a clock signal from the system using the graphic image display device and the display start signal.

4. A graphic image display device as claimed in claim 3, wherein the parameter RAM section stores ROM origin address information corresponding to the ROM origin address signal, X-coordinate origin information corresponding to the X-coordinate origin signal, Y-coordinate origin information corresponding to the Y-coordinate origin signal, and mesh effect ON/OFF information corresponding to the mesh effect ON/OFF signal, as the graphic display parameters, and graphics data of a graphic image stored in an address of the graphics ROM indicated by the ROM origin address signal is displayed on the display screen putting the origin of the graphic image on coordinates of the display screen indicated by the X-coordinate origin signal and the Y-coordinate origin signal, in which normal display of the graphic image is executed according to the first value of the mesh effect ON/OFF signal and mesh effect display of the graphic image is executed according to the second values of the mesh effect ON/OFF signal.

5. A method for displaying graphic images comprising the steps of:

(1) reading original graphics data of a graphic image from a graphics ROM in a display processing section which stores original graphics data of a plurality of graphic images, according to a CPU I/F signal supplied from a CPU as graphics processing control information;

(2) processing the original graphics data according to the CPU I/F signal and generating display graphics data;

(3) outputting the display graphics data from the display processing section to a line buffer section for temporarily storing the display graphics data to be displayed on a line of a display screen;

(4) temporarily storing the display graphics data in the line buffer section; and (5) displaying the display graphics data on the line of the display screen, wherein the method includes the steps of:

(a) judging whether or not instruction to execute mesh effect display is included in the CPU I/F signal and generating a mesh effect ON/OFF signal;

(b) generating a mesh signal including masking information of a mesh pattern to be given to the display graphics data according to the mesh effect ON/OFF signal; and (c) controlling ON/OFF of writing on the storing of the display graphics data in the ine buffer section according to the mesh signal and thereby giving mesh effect to the display graphics data and realizing mesh effect display.

6. A method for displaying graphic images as claimed in claim 5, wherein in the step (c), the control of the ON/OFF of the writing is realized by executing masking to a line buffer write enable signal for enabling writing into the line buffer section, according to the value of the mesh signal.

* * * * *

UNITED STATES PATENT AND TRADEMARK OFFICE

CERTIFICATE OF CORRECTION

PATENT NO. : 6,078,305

DATED : June 20, 2000

INVENTOR(S) : Kenichi Mizutani, et al.

It is certified that error appears in the above-identified patent and that said Letters Patent are hereby corrected as shown below:

On The Title Page, [54] Title: "METHOD DISPLAYING" should read

--METHOD FOR DISPLAYING--

Column 15, Line 39: "2.1" should read --24--

Column 16, Line 7: "2" should read --22--

Column 17, Line 62: "8" should read --18--

Column 19, Line 51: "." should read --,--

Column 20, Line 16: "Section )N" should read --Section 24--

Column 22, line 57, Claim 5: "ine" should read --Line--

Signed and Sealed this

Eighth Day of May, 2001

*Attest:*

Nicholas P. Godici

NICHOLAS P. GODICI

*Attesting Officer* *Acting Director of the United States Patent and Trademark Office*